(12) United States Patent
Meno

(10) Patent No.: US 12,079,923 B2
(45) Date of Patent: Sep. 3, 2024

(54) METHOD FOR CHANGING VIEWPOINT IN VIRTUAL SPACE

(71) Applicant: SONY GROUP CORPORATION, Tokyo (JP)

(72) Inventor: Taihei Meno, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 50 days.

(21) Appl. No.: 17/906,525

(22) PCT Filed: Mar. 24, 2021

(86) PCT No.: PCT/JP2021/012319
§ 371 (c)(1),
(2) Date: Sep. 16, 2022

(87) PCT Pub. No.: WO2021/200494
PCT Pub. Date: Oct. 7, 2021

(65) Prior Publication Data
US 2023/0118515 A1     Apr. 20, 2023

(30) Foreign Application Priority Data
Mar. 30, 2020   (JP) .............................. 2020-060165

(51) Int. Cl.
| | |
|---|---|
| *G06T 15/00* | (2011.01) |
| *G06T 15/20* | (2011.01) |
| *G06T 19/20* | (2011.01) |
| *G06F 3/01* | (2006.01) |
| *G06F 3/0346* | (2013.01) |

(52) U.S. Cl.
CPC .............. *G06T 15/20* (2013.01); *G06T 19/20* (2013.01); *G06F 3/012* (2013.01); *G06F 3/0346* (2013.01); *G06T 2219/2016* (2013.01)

(58) Field of Classification Search
None
See application file for complete search history.

(56) References Cited

U.S. PATENT DOCUMENTS

| 10,944,960 B2 * | 3/2021 | Matsunobu .......... H04N 13/243 |
| 2016/0284048 A1 * | 9/2016 | Rekimoto ............... G06F 3/011 |

(Continued)

FOREIGN PATENT DOCUMENTS

| WO | 2018/216402 A1 | 11/2018 |
| WO | 2019/067112 A1 | 4/2019 |
| WO | 2019/167632 A1 | 9/2019 |

OTHER PUBLICATIONS

International Search Report and Written Opinion of PCT Application No. PCT/JP2021/012319, issued on Jun. 15, 2021, 11 pages of ISRWO.

(Continued)

*Primary Examiner* — Martin Mushambo
(74) *Attorney, Agent, or Firm* — CHIP LAW GROUP

(57) ABSTRACT

An information processing device (control device) includes a control unit that performs control, during control of display of a virtual space accompanied by viewpoint change, to display a model of the virtual space in a manner changeable to any appearance desired by a user, and to display the virtual space by moving a virtual user viewpoint to a position on the virtual space at which the same appearance as an appearance of the model is obtained.

17 Claims, 24 Drawing Sheets

(56) References Cited

U.S. PATENT DOCUMENTS

| | | | | |
|---|---|---|---|---|
| 2017/0153713 | A1* | 6/2017 | Niinuma | G06V 40/113 |
| 2018/0140950 | A1* | 5/2018 | Nishimaki | A63F 13/50 |
| 2018/0255243 | A1* | 9/2018 | Nakamura | G02B 27/0172 |
| 2018/0318703 | A1* | 11/2018 | Kake | A63F 13/428 |
| 2018/0329487 | A1* | 11/2018 | Aoyama | G06F 3/04845 |
| 2019/0104235 | A1* | 4/2019 | Sarkar | H04N 21/47 |
| 2019/0269881 | A1* | 9/2019 | Iida | A61M 21/02 |
| 2020/0218072 | A1* | 7/2020 | Inatani | H04N 7/183 |
| 2021/0014468 | A1* | 1/2021 | Takahashi | A63F 13/25 |
| 2021/0191504 | A1* | 6/2021 | Takahashi | G06V 20/40 |
| 2022/0147138 | A1* | 5/2022 | Muramoto | G02B 27/0179 |

OTHER PUBLICATIONS

Stoakley, et al., "Virtual Reality on a WIM: Interactive Worlds in Miniature", CHI '95 Mosaic of Creativity, Proceedings of the SIGCHI Conference on Human Factors in Computing Systems, May 7-11, 1995, pp. 265-272.

Pausch, et al., "Navigation and Locomotion in Virtual Worlds via Flight into Hand-Held Miniatures", Proceedings of the 22nd annual conference on Computer graphics and interactive techniques, Sep. 15, 1995, pp. 399-400.

Mahalil, et al., "Virtual Reality Mini Map Presentation Techniques: Lessons and experience learned", 2019 IEEE Conference on Graphics and Media (GAME), Nov. 19, 2019, 06 pages.

* cited by examiner

FIG. 23
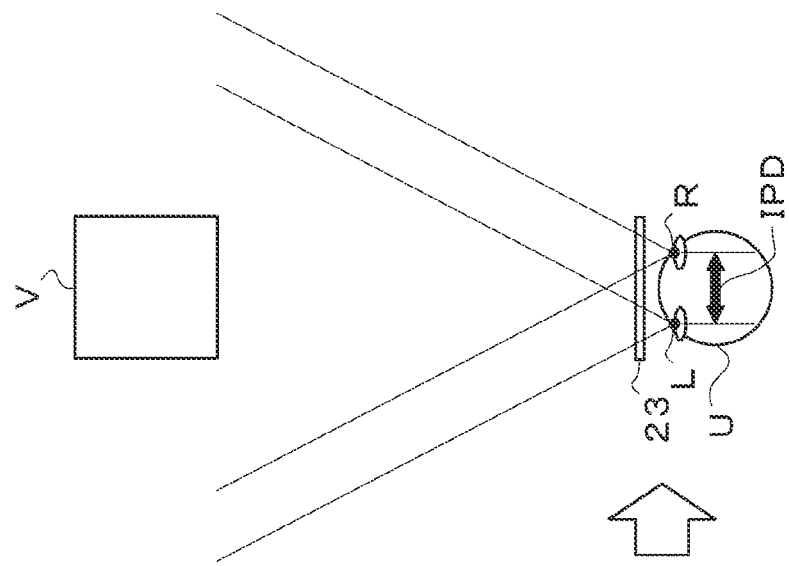
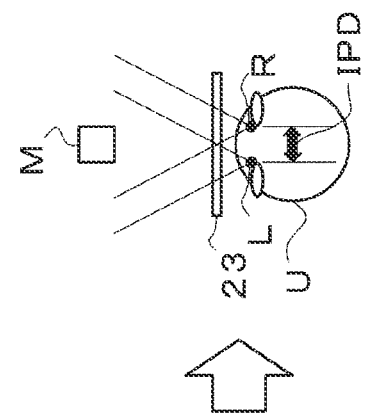
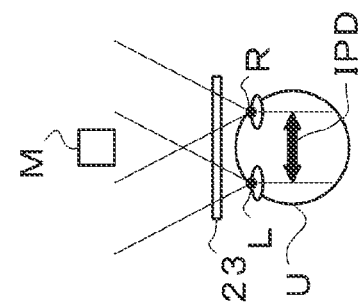

FIG. 24
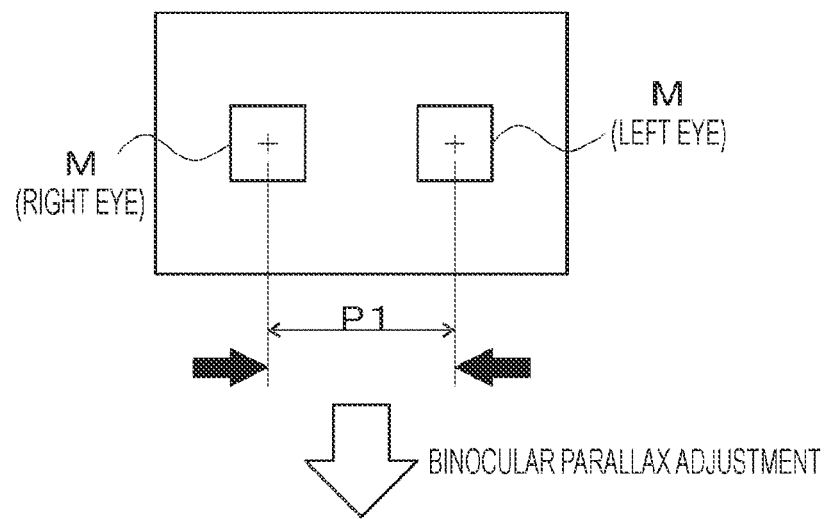
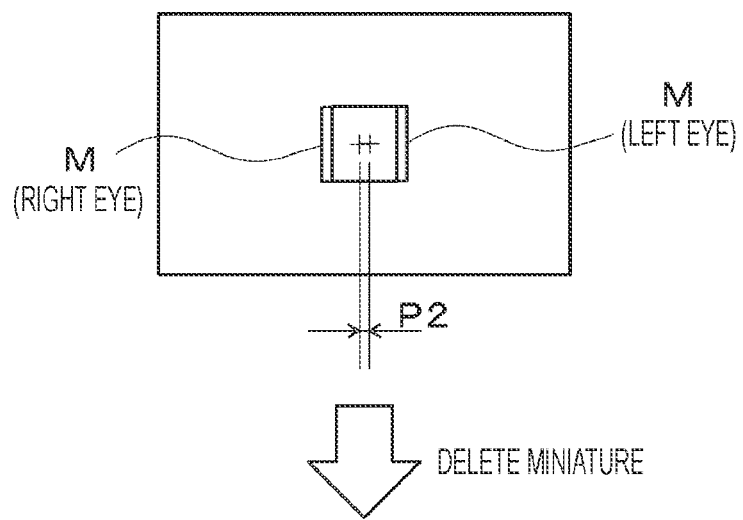
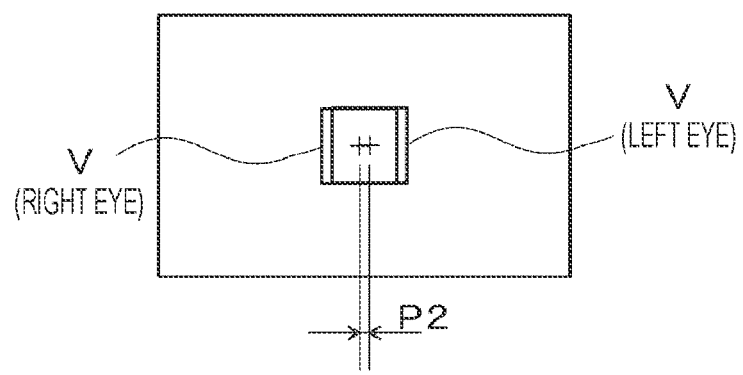

METHOD FOR CHANGING VIEWPOINT IN VIRTUAL SPACE

CROSS REFERENCE TO RELATED APPLICATIONS

This application is a U.S. National Phase of International Patent Application No. PCT/JP2021/012319 filed on Mar. 24, 2021, which claims priority benefit of Japanese Patent Application No. JP 2020-060165 filed in the Japan Patent Office on Mar. 30, 2020. Each of the above-referenced applications is hereby incorporated herein by reference in its entirety.

TECHNICAL FIELD

The present technology relates to an information processing device, an information processing method, and a program.

BACKGROUND ART

Technologies for enhancing comfort of a user in control of display of a virtual space are known. For example, the following Patent Document 1 discloses a technology for reducing discomfort such as motion sickness (so-called virtual reality sickness (VR sickness)) of a user, which is likely to occur during viewpoint change accompanied by continuous movement of the user in a virtual space.

CITATION LIST

Patent Document

Patent Document 1: International Publication No. 2018/216402

SUMMARY OF THE INVENTION

Problems to be Solved by the Invention

Meanwhile, as a method of changing the viewpoint in the virtual space, there is a method of performing movement (discrete movement) that is not accompanied by continuous movement of a user. In this case, the motion sickness of the user can be reduced as compared with the viewpoint change accompanied by the continuous movement, but it is difficult to grasp a self-state (for example, a position, an orientation, and the like) in the virtual space. Furthermore, it is difficult for the user to confirm in advance an appearance of the virtual space at a viewpoint change destination. In this manner, there is room for improving the comfort for the user in the conventional technology.

An object of the present technology is to propose an information processing device, an information processing method, and a program capable of displaying an image comfortable for a user.

Solutions to Problems

The present technology relates to an information processing device including:

a control unit that performs control, during control of display of a virtual space accompanied by viewpoint change, to display a model of the virtual space in a manner changeable to any appearance desired by a user, and to display the virtual space by moving a virtual user viewpoint to a position on the virtual space at which the same appearance as an appearance of the model is obtained.

The present technology relates to an information processing method including causing a processor to perform control, during control of display of a virtual space accompanied by viewpoint change, to display a model of the virtual space in a manner changeable to any appearance desired by a user, and to display the virtual space by moving a virtual user viewpoint to a position on the virtual space at which the same appearance as an appearance of the model is obtained.

The present technology relates to a program causing a computer to implement a control function, during control of display of a virtual space accompanied by viewpoint change, to display a model of the virtual space in a manner changeable to any appearance desired by a user, and to display the virtual space by moving a virtual user viewpoint to a position on the virtual space at which the same appearance as an appearance of the model is obtained.

22B is a view illustrating an example of a position of a virtual user viewpoint in a world coordinate system.

FIG. 23 is a view for describing an example of interocular distance control at the time of deleting a miniature model.

FIG. 24 is a view for describing binocular parallax controlled by changing the interocular distance.

MODE FOR CARRYING OUT THE INVENTION

An embodiment to be described hereinafter is a preferred specific example of the present technology, and various technically preferable limitations are given. However, the scope of the present technology is not limited to the following embodiment unless otherwise specified in the following description. Note that components having substantially the same functional configuration in the present specification and the drawings will be denoted by the same reference sign, and the redundant description thereof will be omitted as appropriate. The present technology will be described in the following order.
1. Embodiment
  1-1. Outline of Information Processing System
  1-2. Configuration of Control Device
  1-3. Configuration of Display Device
  1-4. Configuration of Operation Device
  1-5. Display Control Processing
2. Summary 1. Embodiment

[1-1. Outline of Information Processing System]

Figure 1:
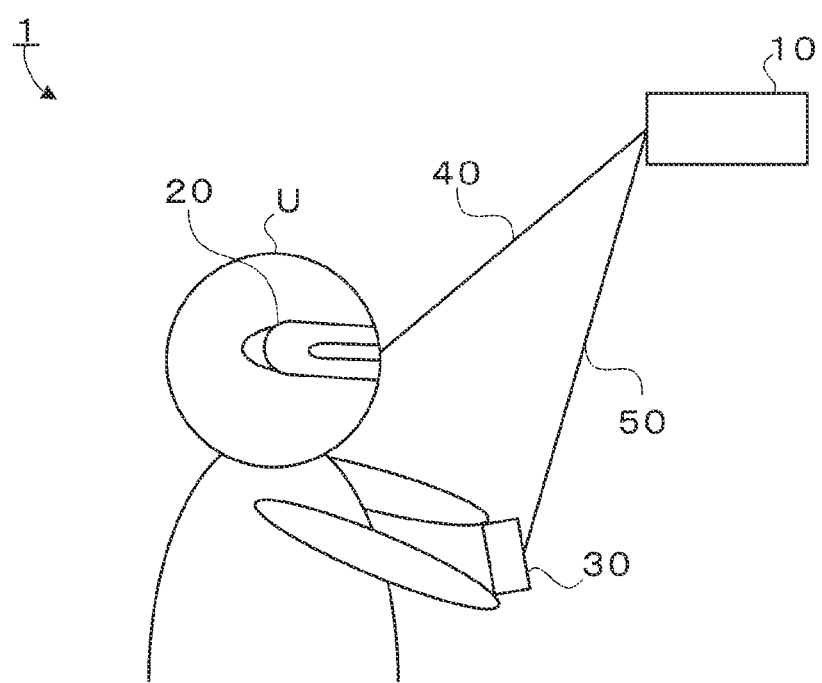
FIG. 1 is a diagram illustrating a configuration example of an information processing system according to the present embodiment.

First, an outline of an information processing system according to the present embodiment will be described with reference to FIG. 1. FIG. 1 is a diagram illustrating a configuration example of the information processing system according to the present embodiment. An information processing system 1 illustrated in FIG. 1 displays a display image to be visually recognized by a user (observer) U. Examples of a content provided to the user U by the display image include a game using a virtual space, live streaming, sports broadcasting, navigation, education, tourist information, shopping, and other experience-based contents. Here, the virtual space is a virtual three-dimensional space constructed by information processing executed by a control device (information processing device) 10. The information processing system 1 includes a control device 10, a display device 20, an operation device 30, and communication lines 40 and 50.

The control device 10 generates a display image of a viewpoint (first-person viewpoint) of the user U using an image of the virtual space. The image of the virtual space is an image of virtual reality (VR), augmented reality (AR), mixed reality (MR) including these, or the like. The image includes a still image and a moving image (video). Note that the image of the virtual space may be an image obtained by capturing an image of an actual scene. That is, the image of the virtual space may be an image representing a captured subject, specifically, an actually captured image, a computer graphic generated on the basis of the actually captured image, or the like. The display image is an image obtained in a case where the virtual space is imaged by virtual cameras installed at predetermined positions in the virtual space. For example, the display image means an image seen in a field of view of the user U in the virtual space. Specifically, the control device 10 sets a virtual user viewpoint that is the viewpoint of the user U in the virtual space, and generates the display image seen from the virtual user viewpoint. Here, the virtual user viewpoint is specified on the basis of attitude detection information transmitted from the display device 20. The attitude detection information is generated by an attitude detection unit incorporated in the display device 20. Then, the control device 10 causes the display device 20 to display the generated display image, thereby causing the display device 20 to display the virtual space.

The display device 20 is a so-called head-mounted display (HMD), and is worn around the eyes of the user U. The above-described display image is displayed on the display device 20. Then, when the virtual user viewpoint is changed by a viewpoint change operation (for example, moving the face, performing an operation of instructing "so-called warp movement (discrete movement)", or the like) by the user U, the display image is changed accordingly. Therefore, the user U can enjoy a virtual experience as if the user U exists in the virtual space.

The operation device 30 is a device (for example, a game controller or the like) that is operated for the control in the control device 10 according to an operation intention of the user U. Specifically, the operation device 30 is operated by being held in the hand of the user U as illustrated in FIG. 1. However, the operation device 30 is not limited thereto, and may be, for example, a device that is worn on the body of the user U and operated according to a motion of the body of the user U, a device that is operated by sound such as voice, a device that is operated using a touch panel, or the like. The control device 10 described above controls the display image to be displayed on the display device 20 according to the user operation using the operation device 30.

The communication line 40 connects the control device 10 and the display device 20 and enables information communication therebetween. The communication line 50 connects the control device 10 and the operation device 30 and enables information communication therebetween. The communication lines 40 and 50 may adopt any connection scheme such as a wired or wireless scheme. Note that any combination of connections may be adopted as long as each of the display device 20 and the operation device 30 is connected to the control device 10. For example, the combination of connections is not limited to one illustrated in FIG. 1, and the operation device 30 may be connected to the display device 20, and the operation device 30 and the control device 10 may be connected with the display device 20 interposed therebetween. Furthermore, for example, the control device 10, the display device 20, and the operation device 30 may be connected to each other using a network such as a local area network (LAN).

Here, the information processing system 1 may be configured such that at least two or more of the control device 10, the display device 20, and the operation device 30 are integrated. For example, the display device 20 may have the function of the control device 10. Furthermore, the display device 20 is not limited to a head-mounted display, and may be another type of display. For example, the display device 20 may be a stationary display or a display of a mobile terminal (for example, a mobile phone, a smartphone, a smart tablet, a portable game machine, or the like). In this case, the attitude detection unit of the display device 20 described above can be achieved, for example, by providing an imaging device on these display and mobile terminals.

In a conventional information processing system, a situation that is not comfortable for a user sometimes occurs in a case where a virtual space accompanied by viewpoint change is displayed. For example, viewpoint change accompanied by continuous movement of the user in the virtual space causes motion sickness of the user. Therefore, Patent Document 1 described above discloses a technology for reducing such discomfort.

Specifically, first, a map image is arranged in the virtual space, and a target point (viewpoint change position) image and a character image are arranged on the map image. Then, the character image is moved to the target point image that is being gazed by the user. That is, the character image is moved following a virtual user viewpoint. Next, an actual scene image (scene image) is displayed in the virtual space around the character image, and the map image and the character image are enlarged with the character image as the center. Then, a display image seen from the virtual user viewpoint is generated and displayed. Therefore, the actual scene image is displayed in front of the eyes. Then, a target point image closest to a gaze point image that is being gazed by the user of the actual scene image is specified to generate a moving viewpoint image (an actual scene image seen from the virtual user viewpoint moving from a gaze point to a target point), the generated image is displayed on an image display frame arranged in the virtual space, thereby performing the viewpoint change accompanied by continuous movement of the user. At this time, the image is displayed in a state where the actual scene image around the image display frame is fixed to mitigate an uncomfortable feeling, such as the motion sickness of the user, and to prevent a feeling of unexpected movement during the viewpoint change.

In this technology, it is necessary to display the moving viewpoint image, and it is difficult to say that viewpoint change with discrete movement is performed. Furthermore, it is difficult to set the viewpoint by searching for a position of an appearance desired by the user at an any place in the virtual space. Therefore, in the embodiment of the present technology, when the display of the virtual space accompanied by viewpoint change is controlled, the control is performed to display a model of the virtual space in a manner changeable to any appearance desired by the user and to display the virtual space by moving the virtual user viewpoint to a position on the virtual space at which the same appearance as an appearance of the model is obtained. Hereinafter, the information processing system 1 according to the present embodiment will be described in detail.

[1-2. Configuration of Control Device]

Figure 2:
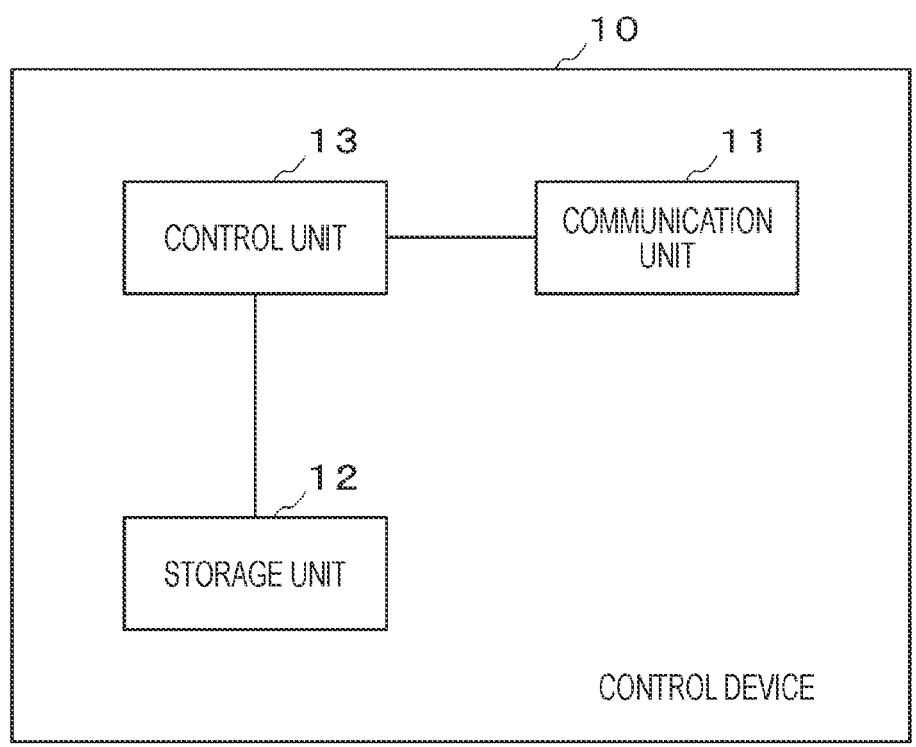
FIG. 2 is a block diagram illustrating a configuration example of a control device.

FIG. 2 is a block diagram illustrating a configuration example of the control device 10. The control device 10 includes a communication unit 11, a storage unit 12, and a control unit 13. The control device 10 includes a central processing unit (CPU, that is, a processor), a random access memory (RAM), a read only memory (ROM), a hard disk, a communication device, and the like as specific hardware configurations. The ROM stores information necessary for processing by the control device 10, for example, a program or the like. The CPU reads and executes the program stored in the ROM. Note that the program may be stored in an external storage, such as a universal serial bus (USB) memory, or may be provided via a network or partially executed by another information processing device via a network.

The communication unit 11 includes, for example, a communication device or the like, and communicates with the display device 20 via the communication line 40 (see FIG. 1) and communicates with the operation device 30 via the communication line 50. Furthermore, the communication unit 11 can also communicate with another information processing device (not illustrated) via a network, and may acquire, for example, an image of a virtual space or the like by the communication.

The communication unit 11 outputs the information (for example, attitude detection information given from the display device 20, and operation information and attitude detection information given from the operation device 30), obtained by each communication described above, to the control unit 13. Furthermore, the communication unit 11 transmits information given from the control unit 13, for example, a display image to the display device 20.

The storage unit 12 includes, for example, a ROM, a RAM, a hard disk, and the like, and stores information necessary for the processing by the control device 10. For example, the storage unit 12 stores a program, various images, and the like. Here, images to be stored in the storage unit 12 include an image of a virtual space and the like.

The control unit 13 includes, for example, a CPU and the like, and controls each component of the control device 10. Furthermore, the control unit 13 generates a display image to be displayed on the display device 20, and outputs the display image to the communication unit 11. Specifically, the control unit 13 sets a virtual user viewpoint that is a viewpoint of a user in the virtual space, and generates the display image seen from the virtual user viewpoint. At that time, the control unit 13 generates a model of the virtual space, and causes the generated model to be included in the display image and displayed. For example, the model is generated on the basis of the image of the virtual space, the attitude detection information given from the operation device 30, and the like.

Here, the model of the virtual space is a target that is included in the virtual space and used as a reference for viewpoint change. For example, in a case where the virtual space is a live venue, examples of the target include the entire live venue, a stage portion, a specific artist, and the like.

Specifically, this model is enlarged or reduced with respect to a display size (real size) of the virtual space. Therefore, the model can be displayed in an appropriate size regardless of the real size. Note that the equal magnification may be applied. Furthermore, this model includes the entire virtual space displayed by the display images, or is selected by the user from the virtual space displayed by the display images. This model is preferably a copy of the virtual space. Therefore, it is possible to eliminate an uncomfortable feeling in a case where the display image is switched in accordance with the viewpoint change as described later.

[1-3. Configuration of Display Device]

Figure 3:
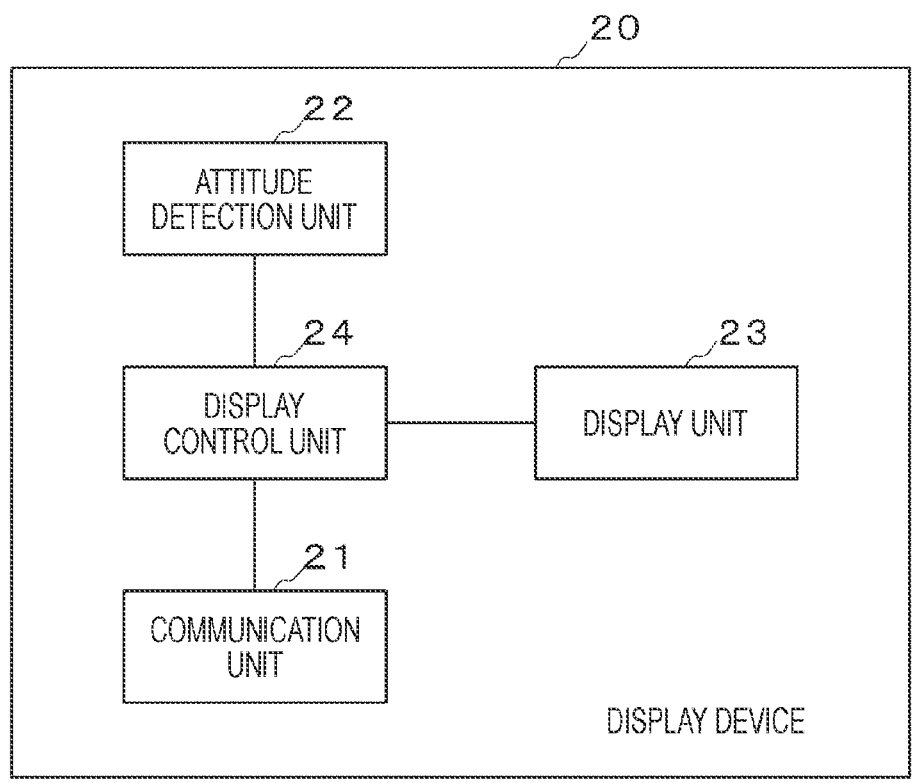
FIG. 3 is a block diagram illustrating a configuration example of a display device.

FIG. 3 is a block diagram illustrating a configuration example of the display device 20. The display device 20 includes a communication unit 21, an attitude detection unit 22, a display unit 23, and a display control unit 24. The display device 20 includes a CPU, a RAM, a ROM, an attitude detection sensor, a head-mounted display panel, a communication device, and the like as specific hardware configurations. The ROM stores information necessary for processing by the display device 20, for example, a program or the like. The CPU reads and executes the program stored in the ROM. Note that the program may be stored in an external storage, such as a universal serial bus (USB) memory, or may be provided via a network or partially executed by another information processing device via a network.

The communication unit 21 includes, for example, a communication device or the like, and communicates with the control device 10 via the communication line 40. The communication unit 21 outputs information obtained by each communication described above, for example, a display image, to the display control unit 24. Furthermore, the communication unit 21 transmits information given from the display control unit 24, for example, attitude detection information as described later, to the control device 10.

The attitude detection unit 22 includes, for example, an attitude detection sensor, and detects an attitude of display device 20. The attitude detection sensor may be, for example, a gyro sensor. The attitude detection unit 22 generates attitude detection information regarding the attitude of the display device 20, and outputs the attitude detection information to the display control unit 24. Here, the attitude of the display device 20 changes depending on an orientation of the head of the user U. Then, a viewpoint of the user U can be roughly specified on the basis of the orientation of the head of the user U. Therefore, the attitude detection information is used to specify a virtual user viewpoint in the present embodiment. In this manner, the virtual user viewpoint is specified on the basis of the attitude detection information by the attitude detection unit 22. Therefore, the user U can move the virtual user viewpoint by changing the orientation of the head.

Here, the attitude detection sensor may be a line-of-sight detection sensor (that is, an imaging device that captures an image of the vicinity of user's eyes) that detects a line of sight of the user U. In this case, the attitude detection sensor can directly detect the line-of-sight of the user U.

Furthermore, the user U can move the virtual user viewpoint by changing the line-of-sight.

The display unit 23 includes, for example, a head-mounted display panel, and displays the display image or the like under the control of the display control unit 24. The display control unit 24 includes, for example, a CPU and the like, and controls each component of the display device 20. Furthermore, the display control unit 24 causes the display unit 23 to display the display image provided from the communication unit 21. Furthermore, the display control unit 24 outputs the attitude detection information provided from the attitude detection unit 22 to the communication unit 21.

[1-4. Configuration of Operation Device]

Figure 4:
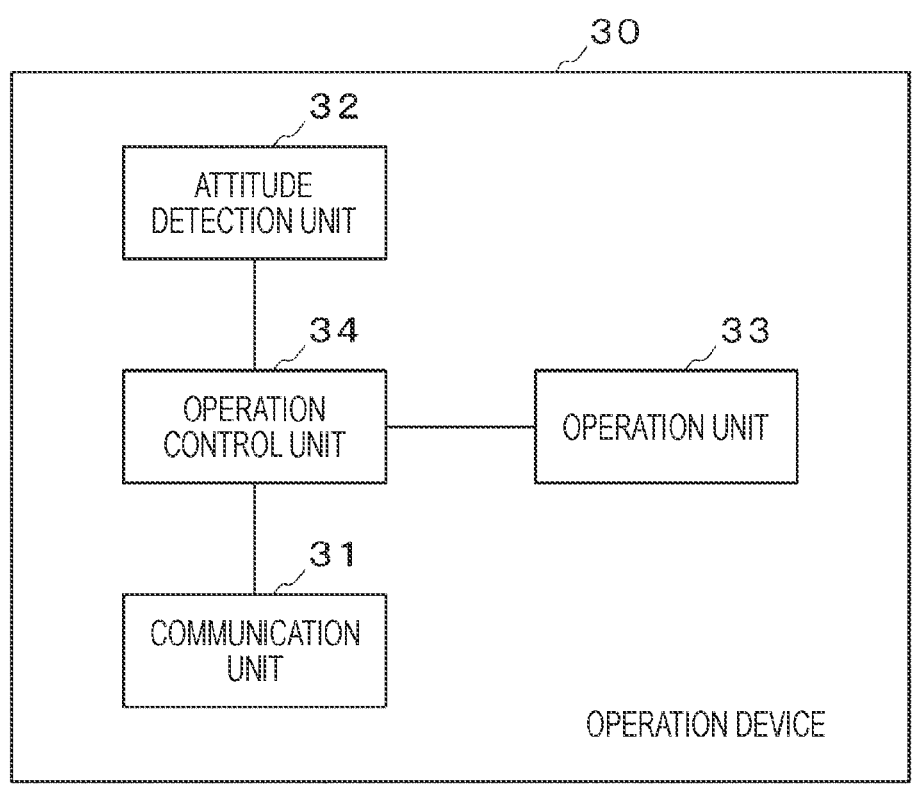
FIG. 4 is a block diagram illustrating a configuration example of an operation device.

FIG. 4 is a block diagram illustrating a configuration example of the operation device 30. The operation device 30 includes a communication unit 31, an attitude detection unit 32, an operation unit 33, and an operation control unit 34. The operation device 30 includes a CPU, a RAM, a ROM, an attitude detection sensor, an operation switch, a communication device, and the like as specific hardware configurations. The ROM stores information necessary for processing by the operation device 30, for example, a program or the like. The CPU reads and executes the program stored in the ROM. Note that the program may be stored in an external storage, such as a universal serial bus (USB) memory, or may be provided via a network or partially executed by another information processing device via a network.

The communication unit 31 includes, for example, a communication device or the like, and communicates with the control device 10 via the communication line 50. The communication unit 31 transmits information given from the operation control unit 34, for example, attitude detection information and operation information, to the control device 10.

The attitude detection unit 32 includes, for example, an attitude detection sensor, and detects an attitude of the operation device 30. The attitude detection sensor may be, for example, a gyro sensor. The attitude detection unit 32 generates attitude detection information regarding the attitude of the operation device 30 and outputs the attitude detection information to the operation control unit 34. Here, the attitude of the operation device 30 changes in accordance with a motion of the hand of the user U holding the operation device 30. Therefore, this attitude detection information is used to move the above-described model in the present embodiment. Note that the information used at the time of moving the model may be operation information generated as the user U operates the operation unit 33.

The operation unit 33 includes, for example, an operation switch such as an operation button or an operation lever, generates operation information according to a user operation, and provides the generated operation information to the operation control unit 34. The operation control unit 34 includes, for example, a CPU and the like, and controls each component of the operation device 30. Furthermore, the operation control unit 34 outputs information given from the attitude detection unit 32, for example, the attitude detection information and information given from the operation unit 33, for example, the operation information, to the communication unit 31.

Note that the information processing system 1 may include a sensor (for example, an imaging device) that detects an attitude of the entire body of the user U. Then, the control unit 13 of the control device 10 may specify a virtual user viewpoint on the basis of detection information given from the sensor. That is, in this case, the control unit 13 uses orientations of the user's face, body, and line-of-sight in a comprehensive manner. Similarly, the control unit 13 may specify an attitude of the operation device 30 on the basis of the detection information given from the sensor.

[1-5. Display Control Processing]

Next, state transition of a display image accompanied by viewpoint change will be described. Note that a case where a virtual reality space (VR space) is used as the above-described virtual space will be described as an example in the following description. Furthermore, a case where a miniature model in which a model including all display objects in the VR space is reduced with respect to the real size is displayed will be described as an example.

Figure 5:
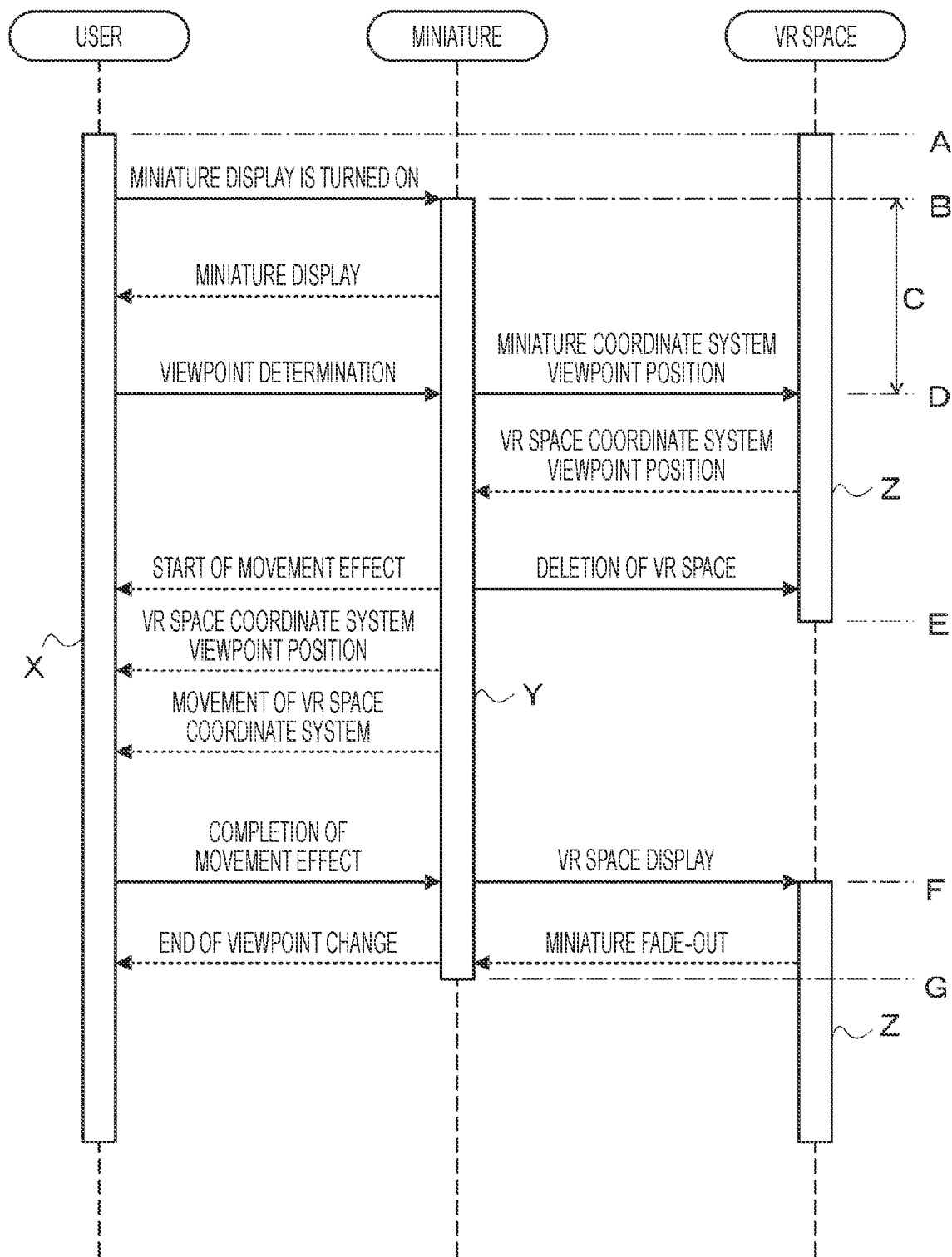
FIG. 5 is a view illustrating an example of state transition of a display image.

FIG. 5 is a view illustrating an example of the state transition of the display image. In FIG. 5, a "user" column represents a control timing related to a display image to be visually recognized by the user, a "miniature" column represents a control timing of a miniature model, and a "VR space" column represents a control timing of the VR space. In FIG. 5, a state X represents that the display image is being displayed, a state Y represents that the miniature model is being displayed by the display image, and a state Z represents that the VR space is being displayed by the display image. Note that FIGS. 6 to 13 referred to in the following description are views illustrating image examples viewed by the user U.

Figure 6:
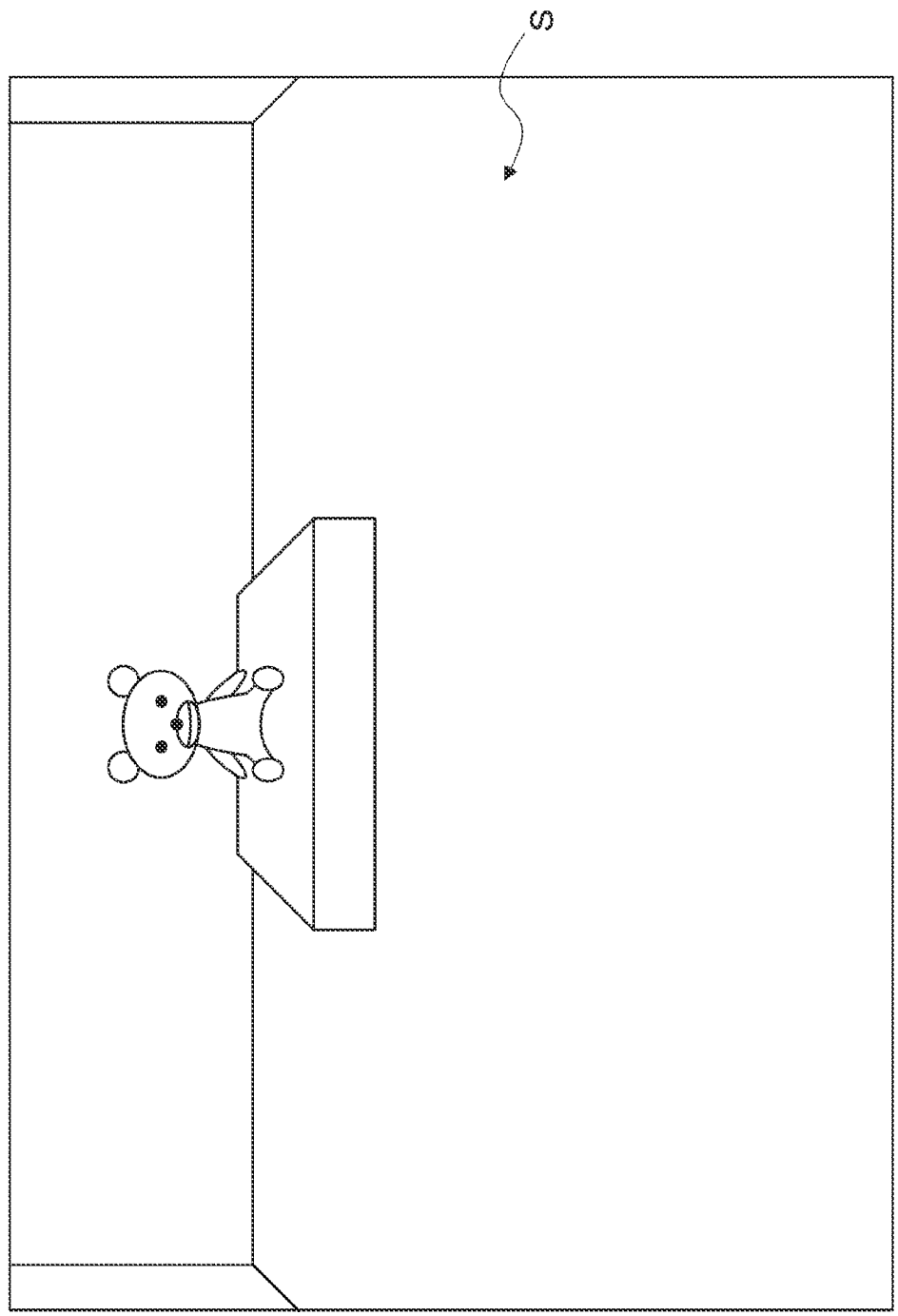
FIG. 6 is a view illustrating an image example viewed by a user in an initial state.

As illustrated in FIG. 6, the control of the display image accompanied by the viewpoint change is started from a state (an initial state A) in which a VR space S is displayed by the display image. This initial state A is a state where the user U is in the VR space S. In the illustrated example, the display image is displayed on the display device 20, so that the VR space S in which an indoor space surrounded by a wall and a floor in front of the user U, a table placed on the floor near the central wall of the indoor space, and an ornament of a bear sitting on the table facing the user U can be seen.

Figure 7:
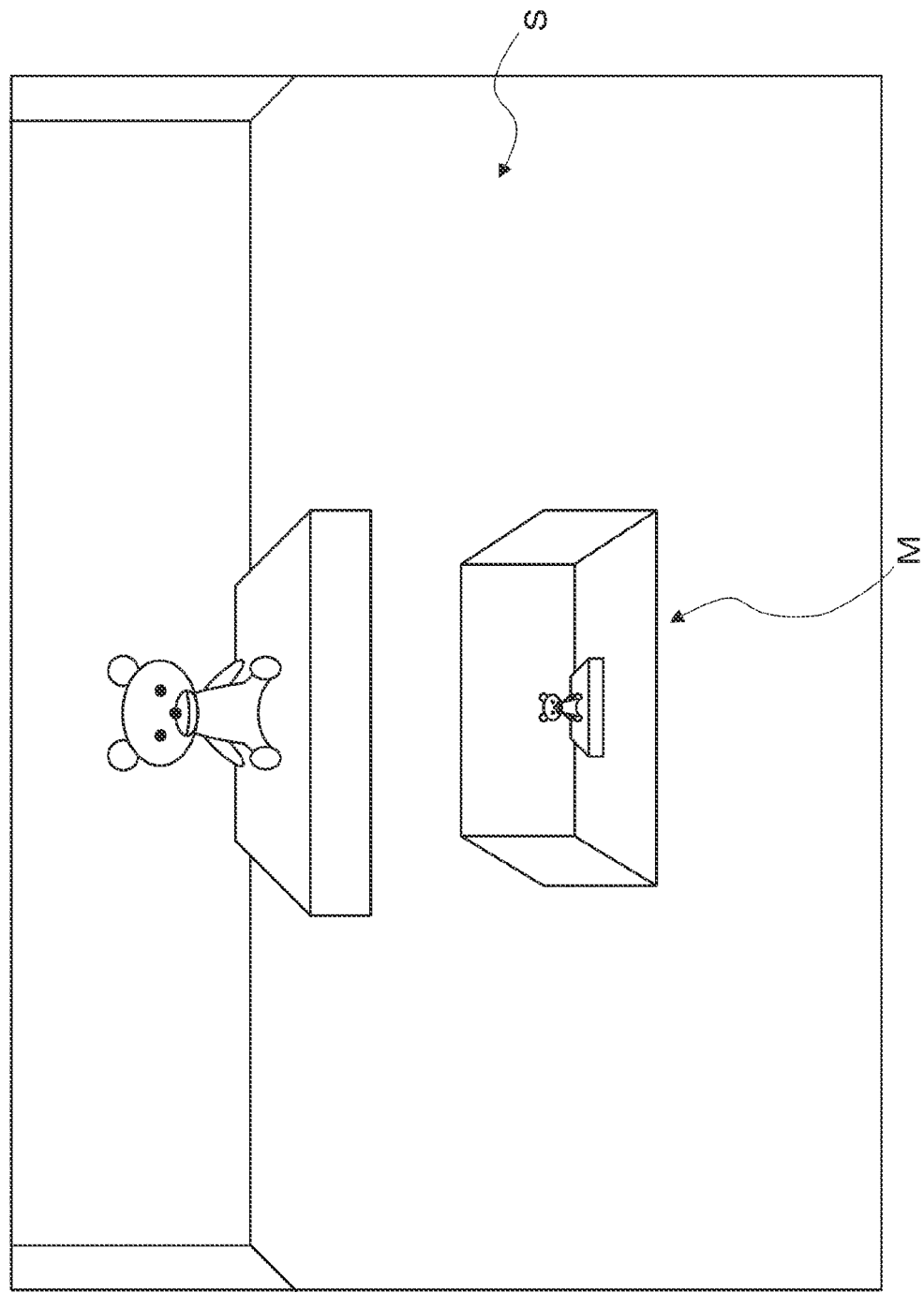
FIG. 7 is a view illustrating an image example in a miniature display state.

Then, when an instruction to turn on miniature display is made from the initial state A, a miniature model M of the VR space S is displayed together with the VR space S described above (a miniature display state B) as illustrated in FIG. 7. In the illustrated example, the miniature model M including the entire indoor space (display objects of the VR space S) illustrated in FIG. 6 is displayed together with the VR space S.

Note that the miniature model M is preferentially displayed so as to be seen at a position closer to the user U than the VR space S. For example, the miniature model M is displayed at a position where the center position thereof is closer to the user U than the center position of the VR space S. Therefore, the miniature model M can be made to be easily seen by the user U. As illustrated in the drawing, the miniature model M is displayed specifically in the vicinity of the user U, more specifically, close to the hand of the user U. Note that the display position of the miniature model M is not limited to these positions.

Figure 8:
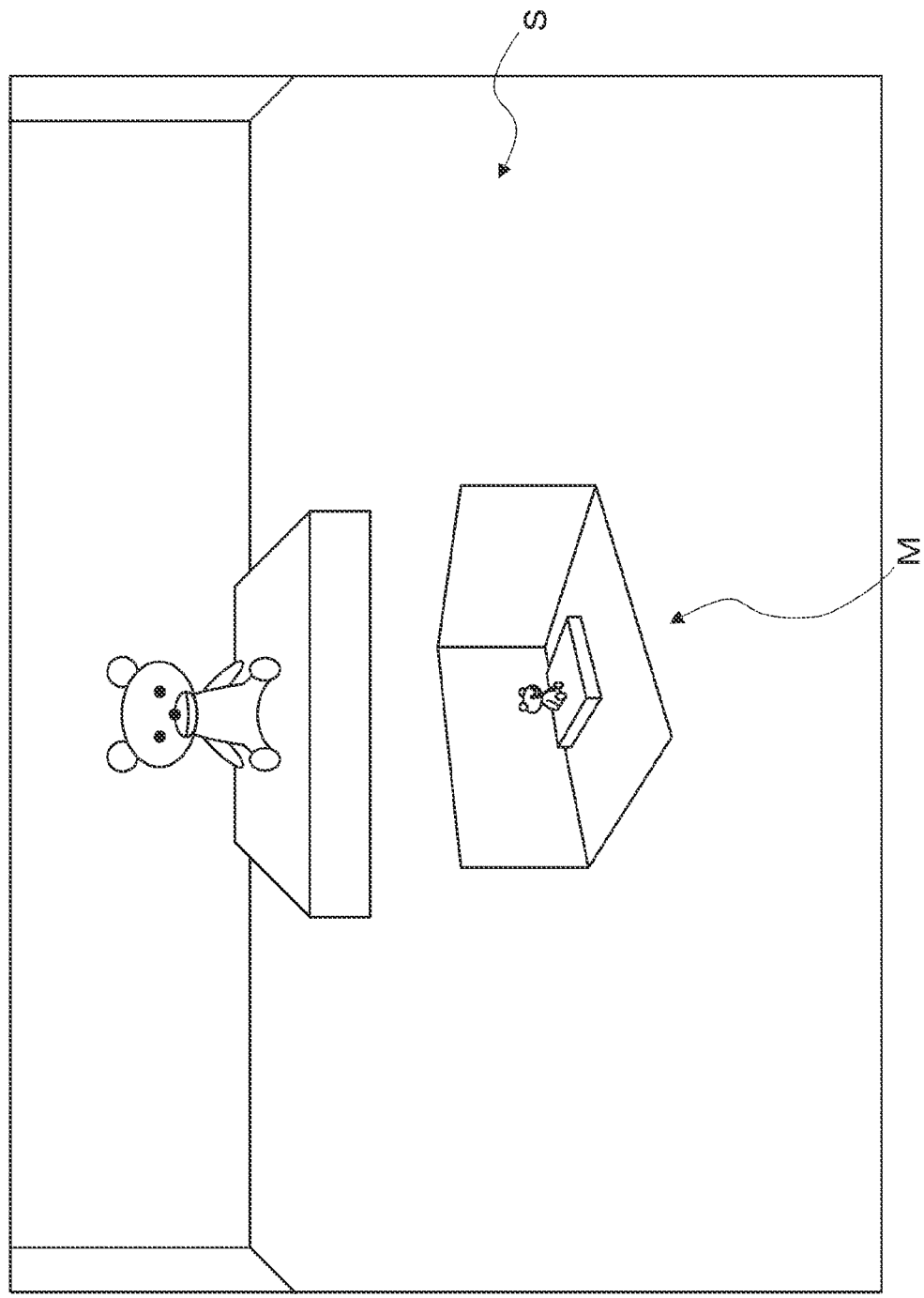
FIG. 8 is a view illustrating an image example in a viewpoint-moved state.
Figure 9:
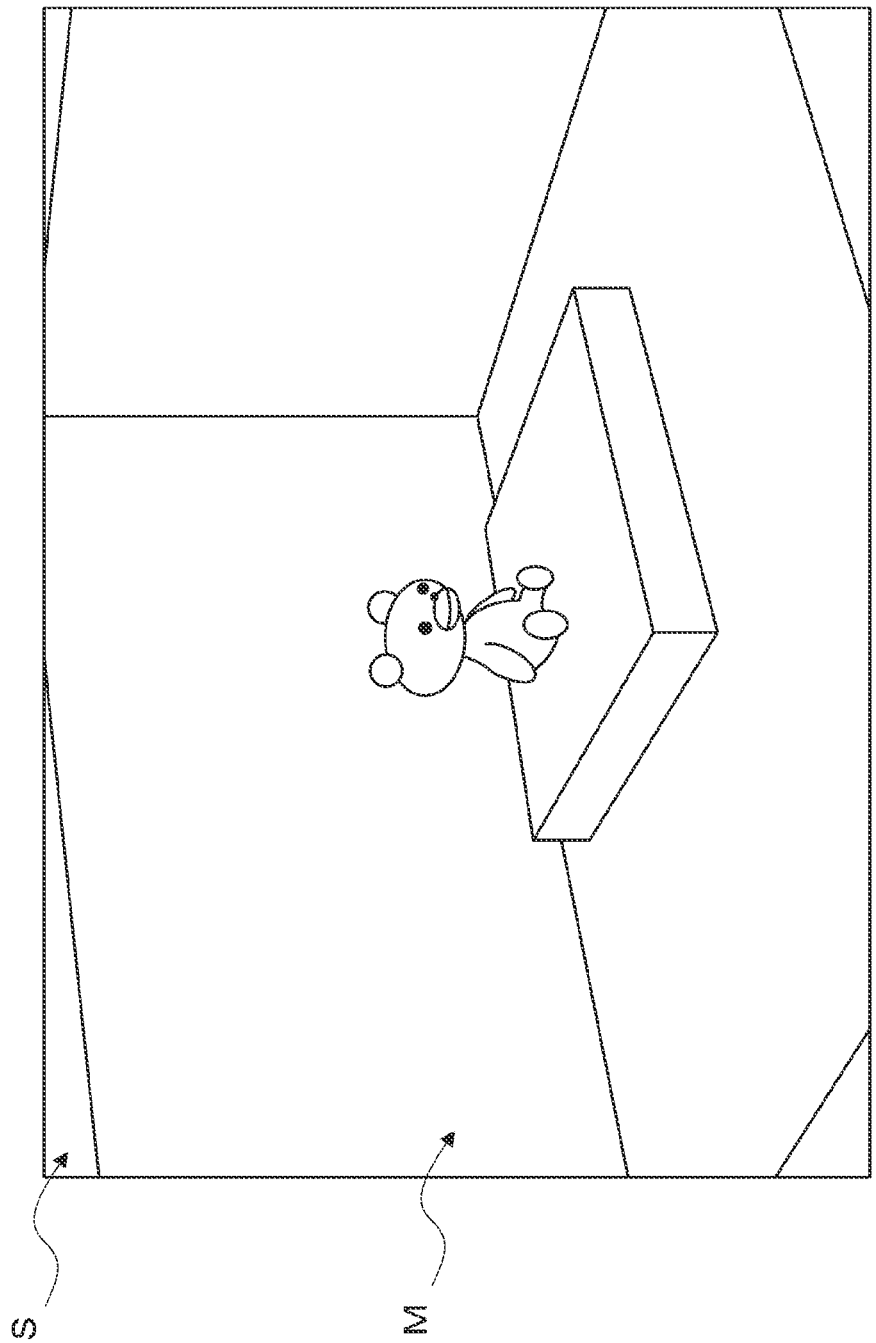
FIG. 9 is a view illustrating an image example in a viewpoint-determined state.

Then, a positional relationship between a virtual user viewpoint and the miniature model M is moved (a viewpoint-moved state C) by the user U from the miniature display state B as illustrated in FIG. 8, and any positional relationship desired by the user U is determined as illustrated in FIG. 9. That is, a position of the virtual user viewpoint relative to the miniature model M is determined (a viewpoint-determined state D). Note that the miniature model M is configured to move in conjunction with movement of the operation device 30 operated by the user, and is displayed such that a position to which the user U desires to change the viewpoint (a position at which a desired appearance is obtained) can be searched for. For example, the miniature model M is displayed so as to be rotatable in all directions about a predetermined point such as the central portion thereof. Note that the miniature model M may be rotatable about a predetermined axis instead of a predetermined point. For example, in a case where the height of the viewpoint does not change such as horizontal movement of the user U, it is only required for the miniature model M to be rotatable about an axis extending in the vertical direction. Furthermore, the miniature model M is displayed such that the distance from the user U can be adjusted. Specifically, the user U adjusts the distance by approaching or moving away from the miniature model M. Note that this distance may be adjusted by moving the miniature model M. A rotation angle of the miniature model M and the distance from the user U are controlled on the basis of attitude detection information or the like given from the operation device 30 to the control unit 13 of the control device 10. Note that the user U may operate the operation unit 33 of the operation device 30, and control may be performed on the basis of operation information obtained by the operation.

In the example illustrated in FIG. 8, the miniature model M illustrated in FIG. 7 is moved to a state of being seen by the user U from a position upper left side. Note that not the miniature model M but the user U may move, or the user U may move while moving the miniature model M.

In the example illustrated in FIG. 9, the position of the virtual user viewpoint relative to the miniature model M is determined to be a position at which the user U and the miniature model M approach each other by looking into the miniature model M from the state illustrated in FIG. 8. For example, the position of the virtual user viewpoint can be determined on the basis of whether or not the miniature model M is gazed at for a predetermined period of time or more. Note that the user U may directly make an instruction by operating the operation unit 33 of the operation device 30.

Specifically, the position of the virtual user viewpoint relative to the miniature model M is represented by a coordinate position (miniature coordinate system viewpoint position) with a predetermined position in the virtual space as a reference point. Then, a position of the virtual user viewpoint in the VR space corresponding to the viewpoint position (VR space coordinate system viewpoint position) is determined in response to the determination of the miniature coordinate system viewpoint position. Details of this correspondence will be described later. Specifically, the position of the virtual user viewpoint in the VR space is represented by a coordinate position (VR space coordinate system viewpoint position) with a predetermined position in the virtual space as a reference point.

Figure 10:
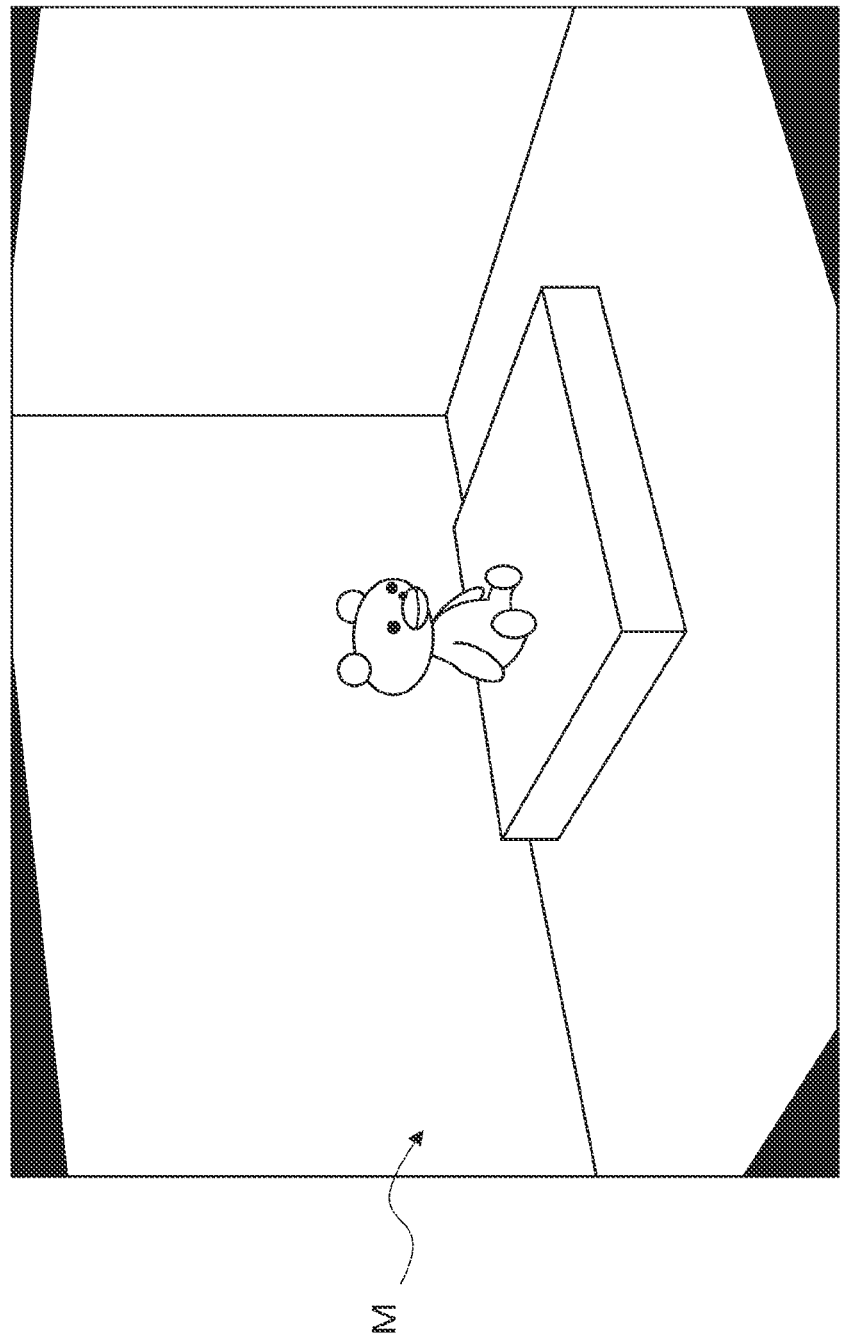
FIG. 10 is a view illustrating an image example in a VR space-deleted state.

Next, the VR space S is deleted (a VR space-deleted state E) as illustrated in FIG. 10. In the illustrated example, the VR space S is deleted by displaying a portion where the VR space S other than the miniature model M has been displayed in black to perform dark display. Note that the deletion of the VR space S may be performed by any display that enables a scene to be smoothly switched, and, for example, may be performed by displaying a color other than black such as white or gray or by fadeout.

Figure 11:
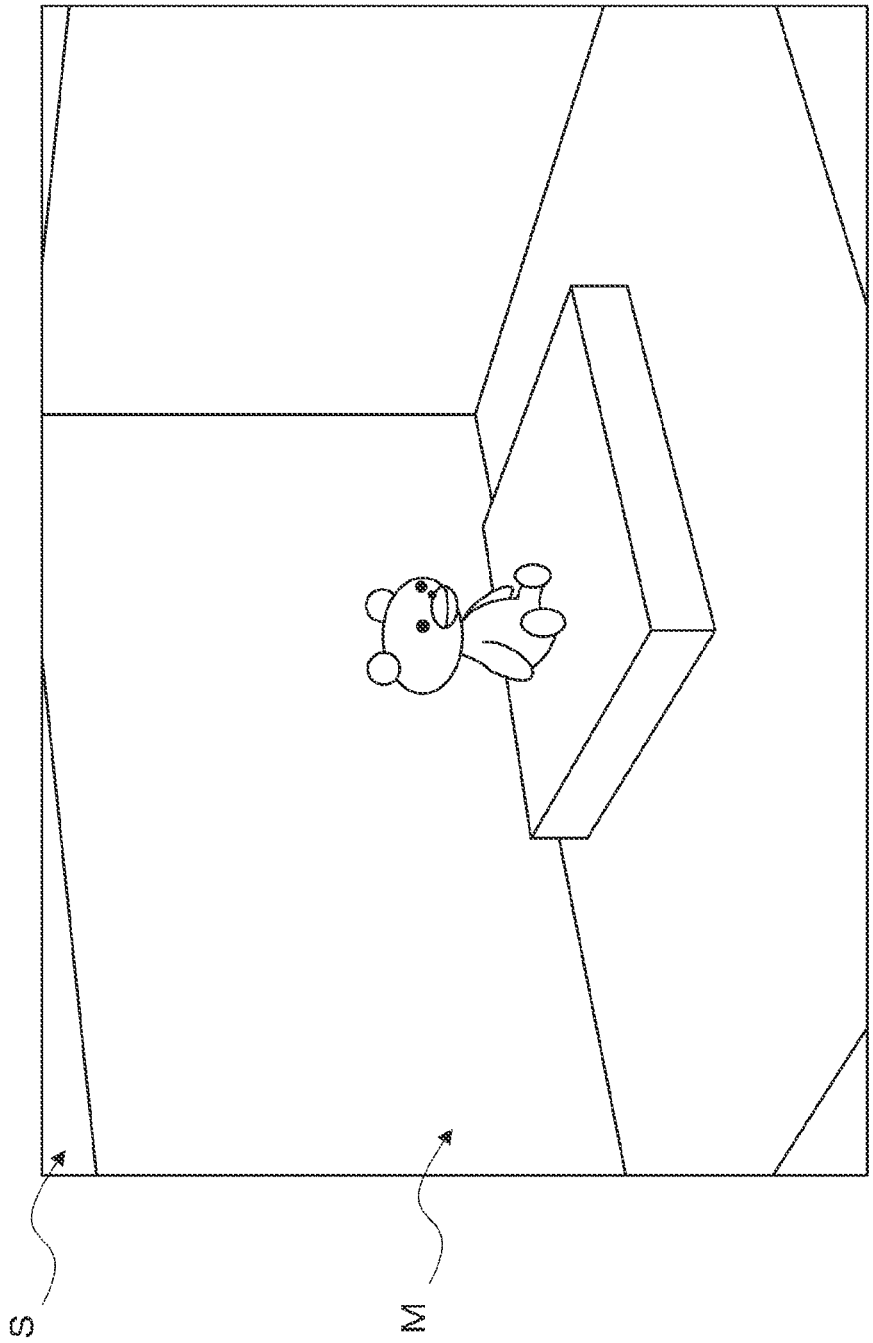
FIG. 11 is a view illustrating an image example of a movement destination VR space display state.

Furthermore, a movement effect on the display of the display image is started as illustrated in FIG. 5 in addition to the deletion of the VR space S. After the start of the movement effect, movement of the virtual user viewpoint in the VR space S (VR space coordinate system movement) is performed on the basis of the viewpoint position (VR coordinate system viewpoint coordinate) in the VR space S determined as described above, and the movement effect is completed. Then, as a result, the VR space S after the movement of the virtual user viewpoint is displayed (a movement destination VR space display state F) as illustrated in FIG. 11. In the illustrated example, the VR space S after the viewpoint movement is displayed behind the miniature model M. For example, the display of the VR space S may be faded in. Therefore, the VR space S can be displayed without an uncomfortable feeling.

Figure 12:
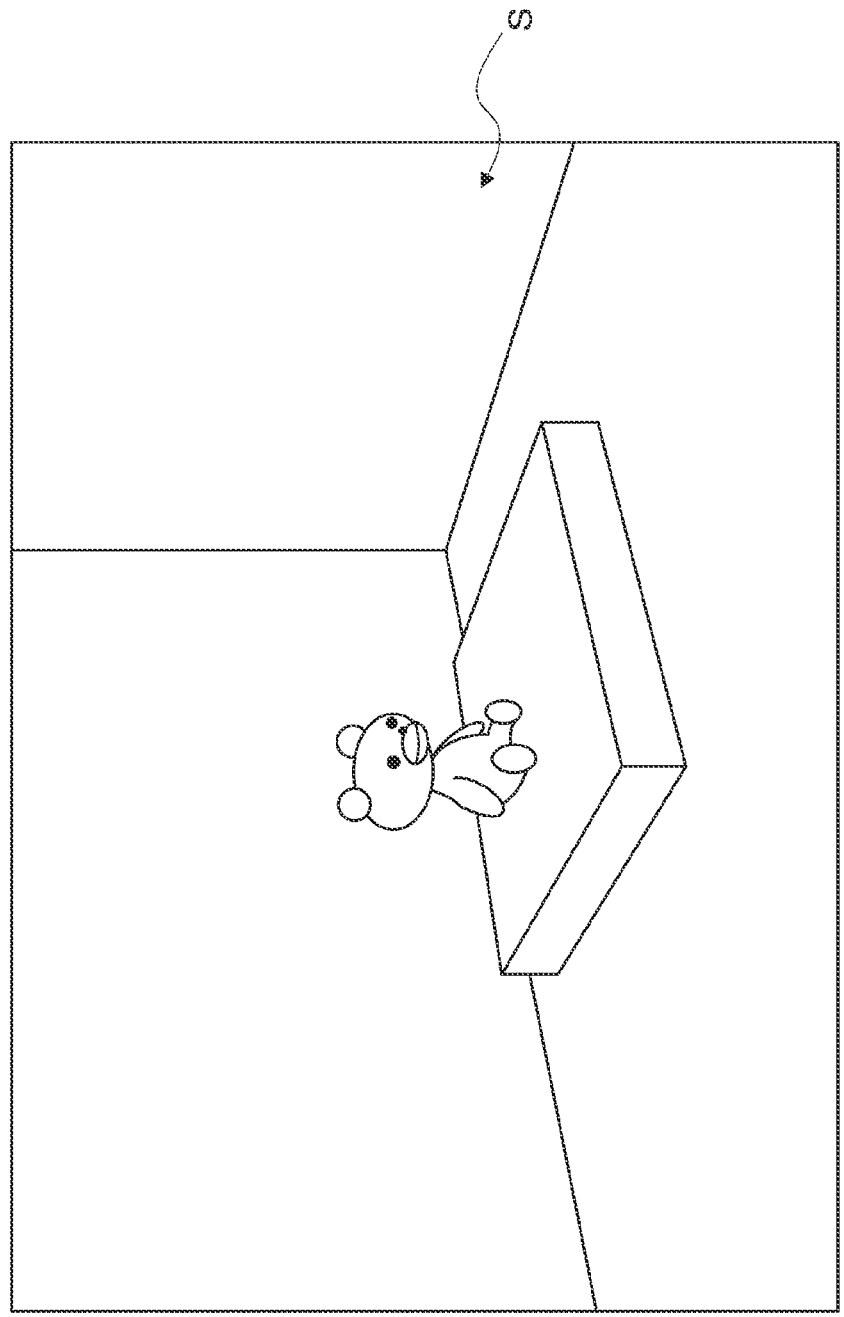
FIG. 12 is a view illustrating an image example in a miniature-deleted state.

After the VR space S after the viewpoint movement is displayed, the display of the miniature model M is deleted as illustrated in FIG. 12. That is, the miniature model M is hidden (a miniature-deleted state G). Note that the miniature model M may be deleted by fadeout in order to eliminate an uncomfortable feeling. The control of the display image accompanied by the viewpoint change ends with the deletion of the miniature model M.

Figure 13:
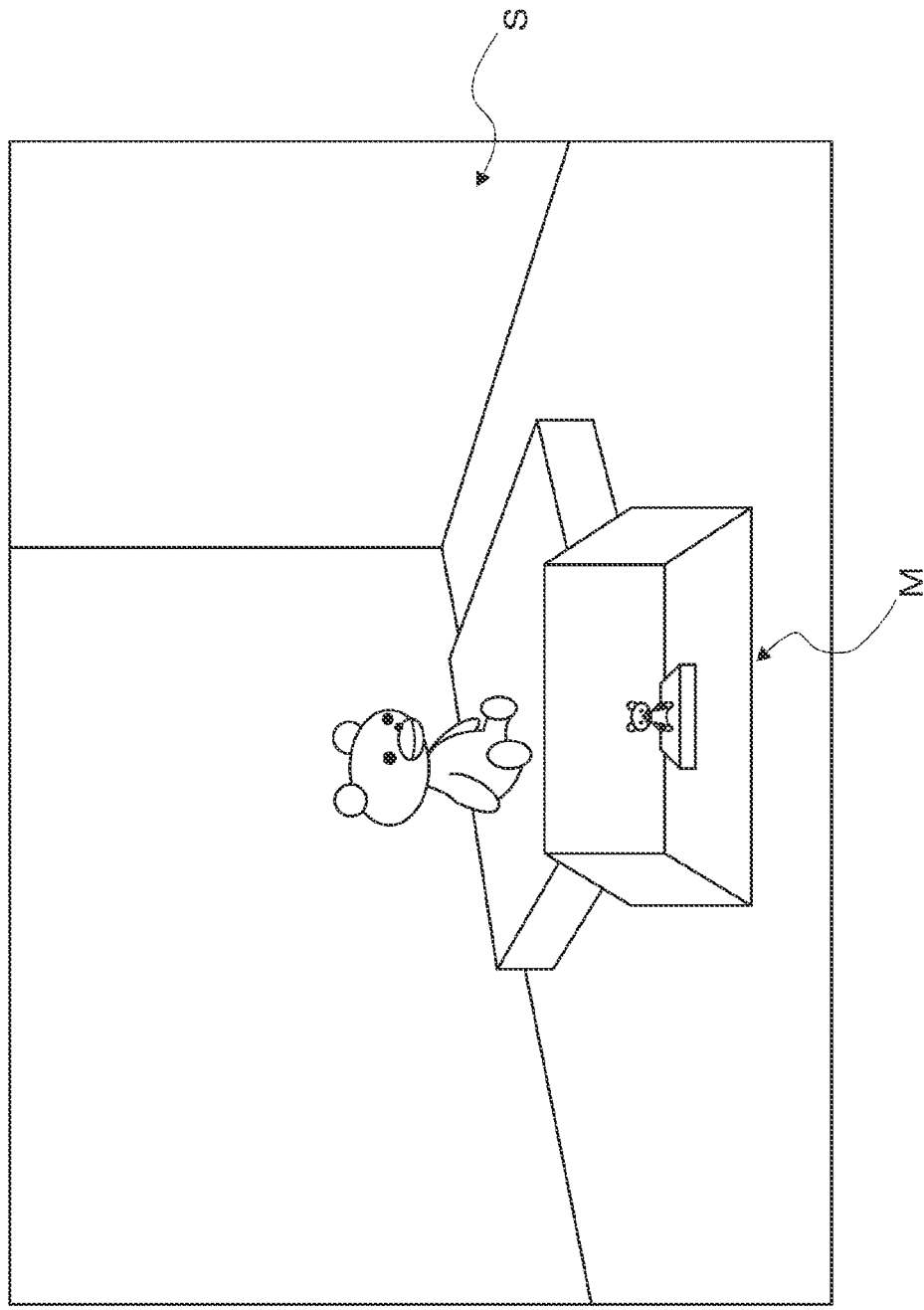
FIG. 13 is a view illustrating an image example in a miniature redisplay state.

In a case where the viewpoint change is performed again at a viewpoint change destination, the miniature model M is displayed again (a miniature display state B1) to control the display image as illustrated in FIG. 13, which is similar to the case described above. In the illustrated example, the same miniature model M as that illustrated in FIG. 6 is displayed. Note that the miniature model M in the state after the movement illustrated in FIG. 12 may be displayed.

The miniature model M is not limited to one including all the display objects in the predetermined VR space S as described with reference to FIGS. 6 to 13, and may be one partially selected by the user U from among the display objects in the predetermined VR space S as described below. Note that the following description is similar to the case described above (case described with reference to FIGS. 6 to 13) except that display of the miniature model M is different, and the description thereof is appropriately omitted.

Figure 14:
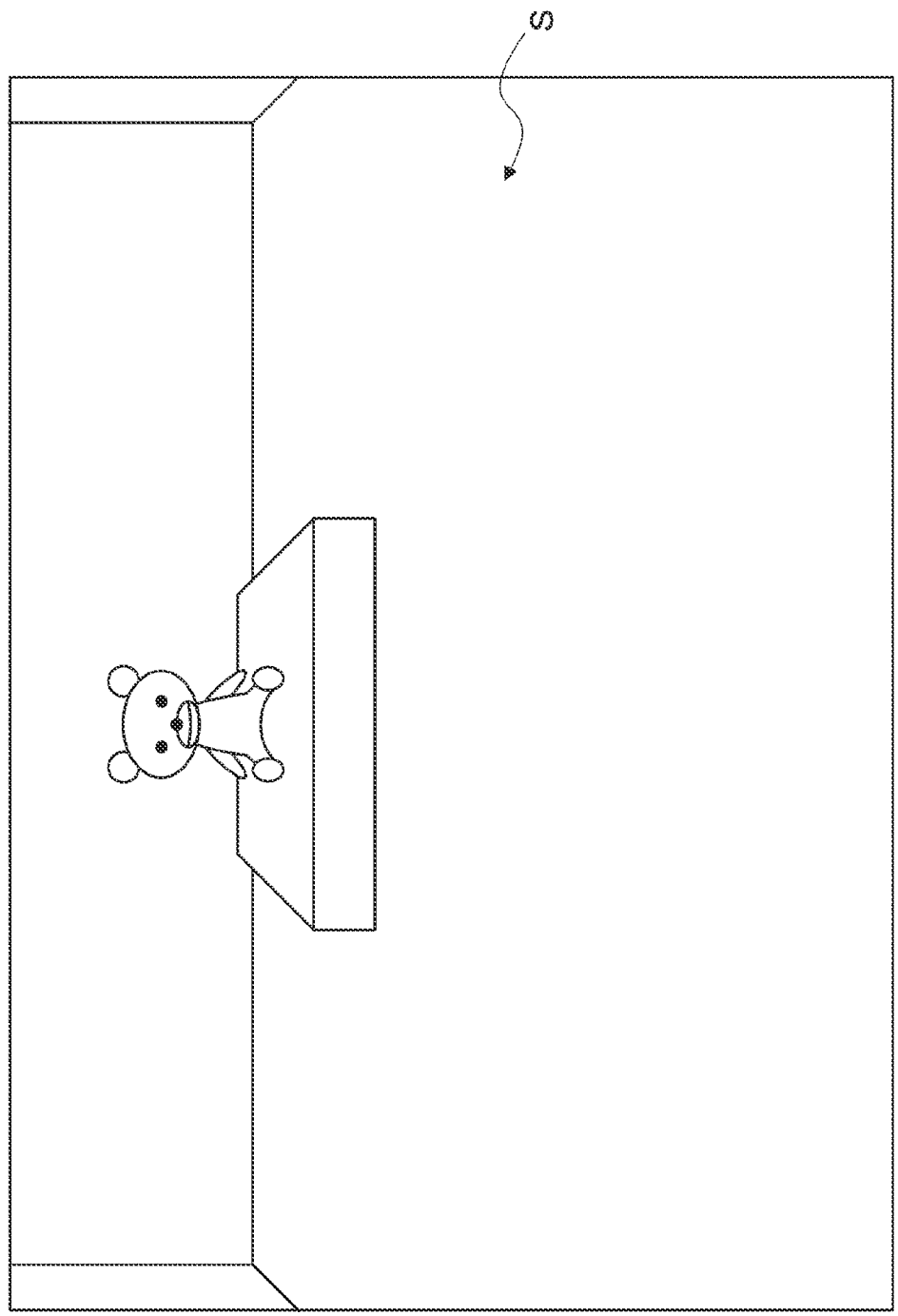
FIG. 14 is a view illustrating another image example in the initial state.

The control of the display image accompanied by the viewpoint change in this case is started from a state (the initial state A) in which the VR space S is displayed by the display image as illustrated in FIG. 14. In the illustrated example, the VR space S similar to that illustrated in FIG. 6 can be seen.

Figure 15:
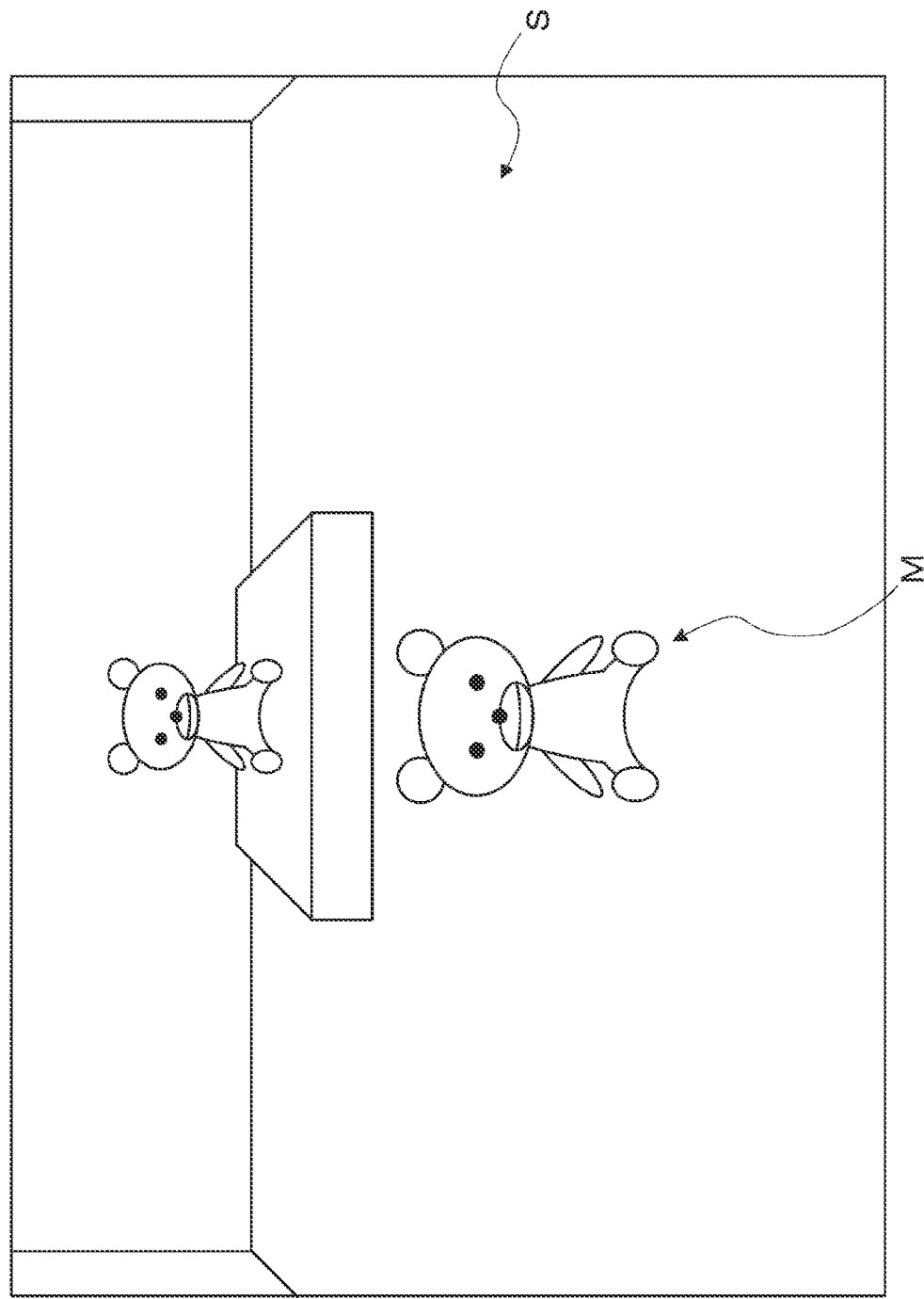
FIG. 15 is a view illustrating another image example in the miniature display state.

Then, when an instruction to turn on miniature display is made from the initial state A, the miniature model M selected from among the display objects of the VR space S is displayed together with the VR space S described above (the miniature display state B) as illustrated in FIG. 15. In the illustrated example, the miniature model M of the bear ornament selected by the user U from the indoor space illustrated in FIG. 14 is displayed. Specifically, the user U selects and determines any target from among the display objects in the VR space using the operation device 30, whereby the miniature model M is displayed. Note that the selection method is not limited thereto, and for example, an imaging device may read irradiation of a laser pointer performed by the user U, and a target of an irradiation point may be selected as the miniature model M. Therefore, the user U can easily select the target. Note that the laser pointer may be included in the operation device 30 or may be provided individually in the information processing system 1.

Figure 16:
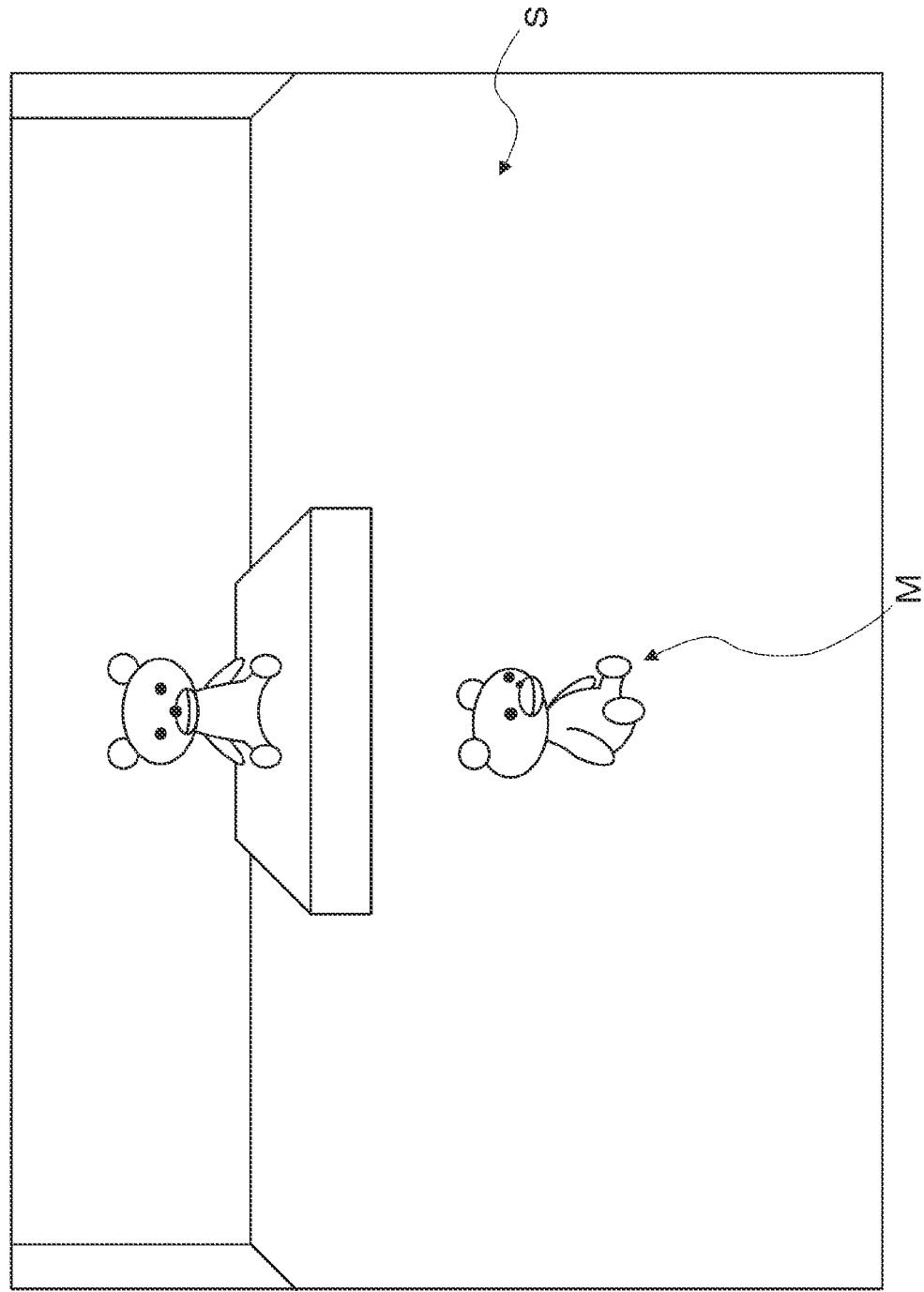
FIG. 16 is a view illustrating another image example in the viewpoint determined-state.

Then, a positional relationship between a virtual user viewpoint and the miniature model M is moved (the viewpoint-moved state C) by the user U from the miniature display state B, and any positional relationship desired by the user U is determined as illustrated in FIG. 16. That is, a position of the virtual user viewpoint relative to the miniature model M is determined (a viewpoint-determined state D).

Then, a miniature coordinate system viewpoint position is determined in response to the determination of the viewpoint position, and a VR space coordinate system viewpoint position corresponding to the miniature coordinate system viewpoint position is determined.

Figure 17:
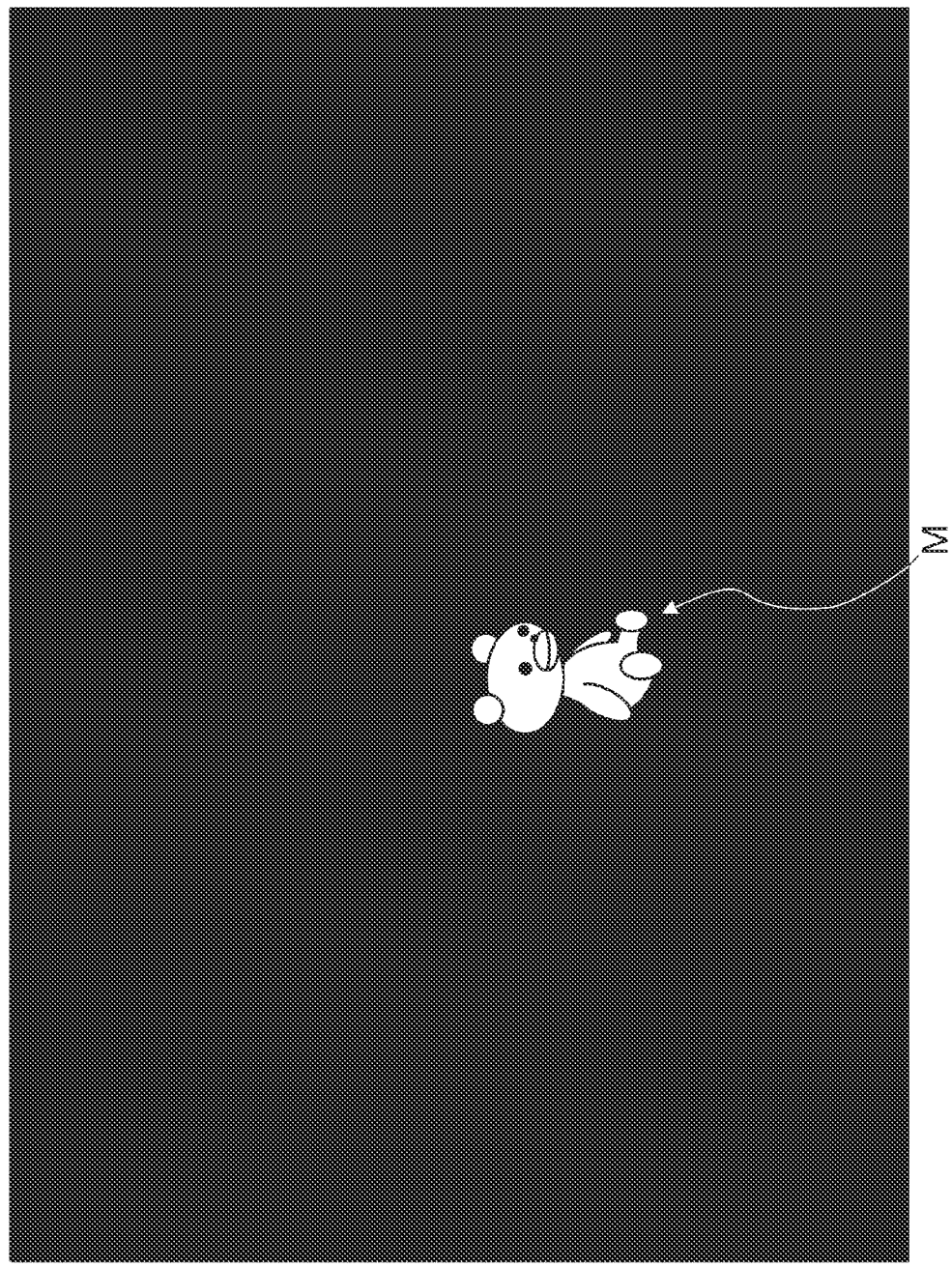
FIG. 17 is a view illustrating another image example in the VR space-deleted state.
Figure 18:
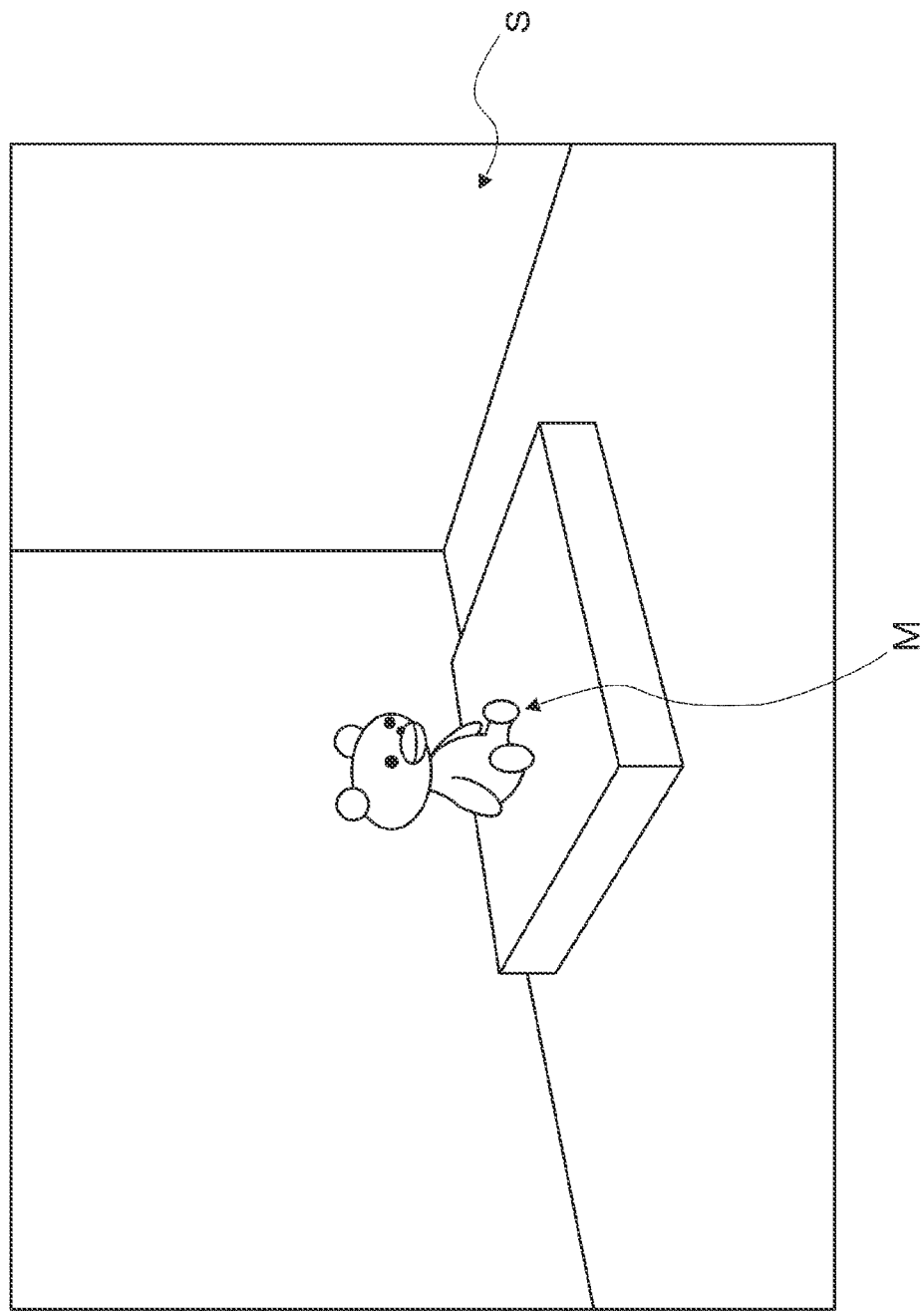
FIG. 18 is a view illustrating another image example of the movement destination VR space display state.

Next, the VR space S is deleted (specifically, displayed in dark) (the VR space-deleted state E) as illustrated in FIG. 17. Furthermore, a movement effect on the display of the display image is started in addition to the deletion of the VR space S. After the start of the movement effect, VR space coordinate system movement is performed on the basis of the VR space coordinate system viewpoint position, and the movement effect is completed. Then, as a result, the VR space S after the movement of the virtual user viewpoint is displayed (the movement destination VR space display state F) as illustrated in FIG. 18.

Figure 19:
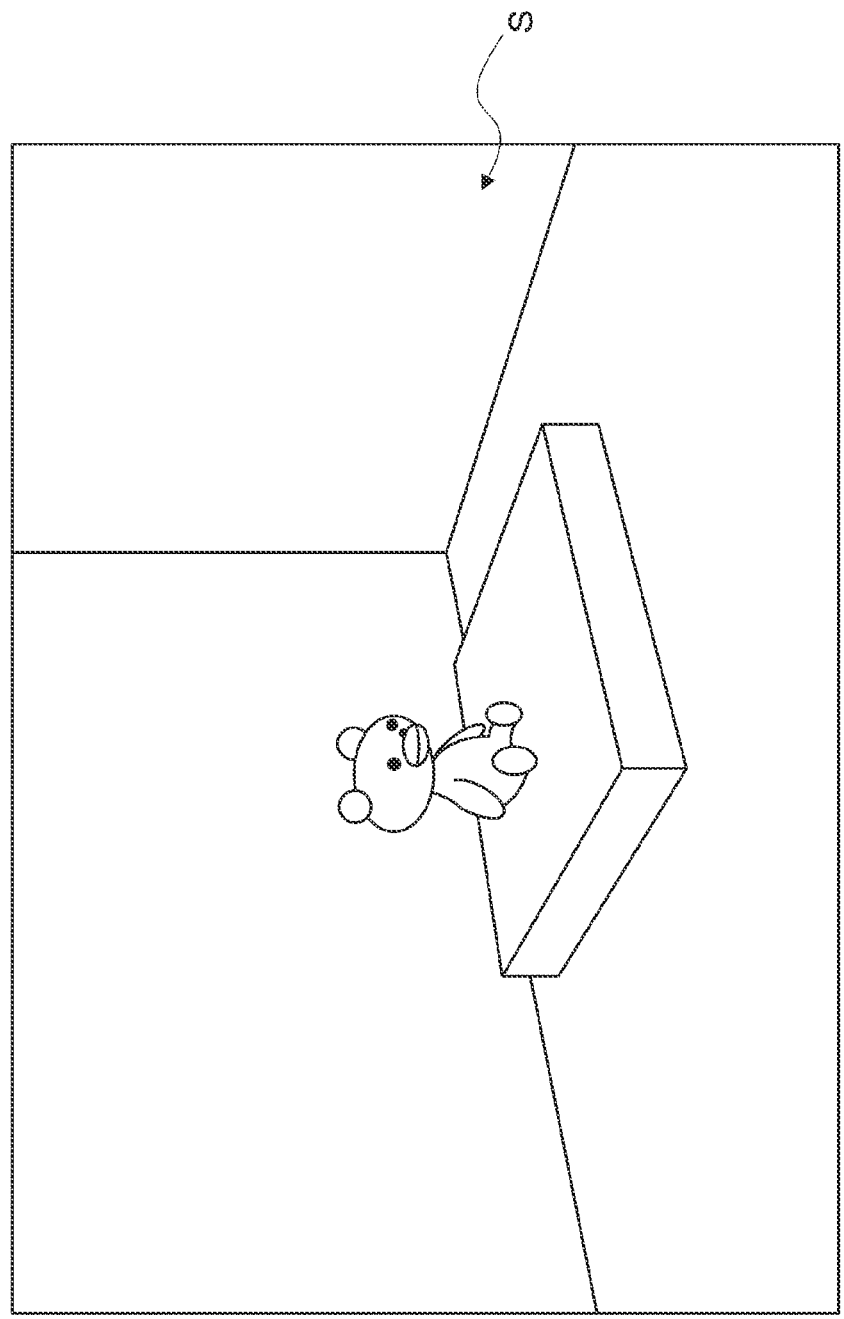
FIG. 19 is a view illustrating another image example in the miniature-deleted state.

After the VR space S after the viewpoint movement is displayed, the display of the miniature model M is deleted as illustrated in FIG. 19. That is, the miniature model M is hidden (a miniature-deleted state G). The control of the display image accompanied by the viewpoint change ends with this deletion of the miniature model M.

Figure 20:
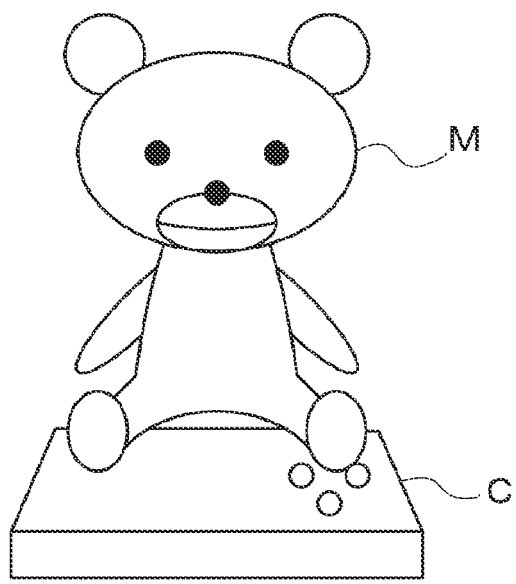
FIG. 20 is a view illustrating a display example of a miniature model.

FIG. 20 is a view illustrating a display example of the miniature model M. In the illustrated example, the operation device 30 is virtually displayed, that is, a virtual controller C for manual operation that corresponds to the operation device 30 is displayed to display the miniature model M on the controller C. For example, the controller C displays information close to the hand of the user U. The display of the controller C is controlled such that the control unit 13 of the control device 10 moves in conjunction with the operation device 30 (the same movement as the operation device 30) using attitude detection information given from the operation device 30. Since the miniature model M is displayed on the controller C in this manner, the user U can intuitively and easily move the miniature model M. For example, in this case, the miniature model M can be operated in conjunction with the movement of the operation device 30 without an uncomfortable feeling by rotating the miniature model M about the central portion of the controller C. For example, in a content of a concert image or the like, the user U is caused to select a favorite artist from a plurality of people, and a miniature model of the selected artist is displayed on the virtual controller C. In this manner, it is possible to enjoy viewing a favorite target from favorite position and angle. Furthermore, it is possible to perform viewing closer to the favorite target. Note that the miniature model M described with reference to FIGS. 6 to 13 may be similarly displayed.

Figure 21:
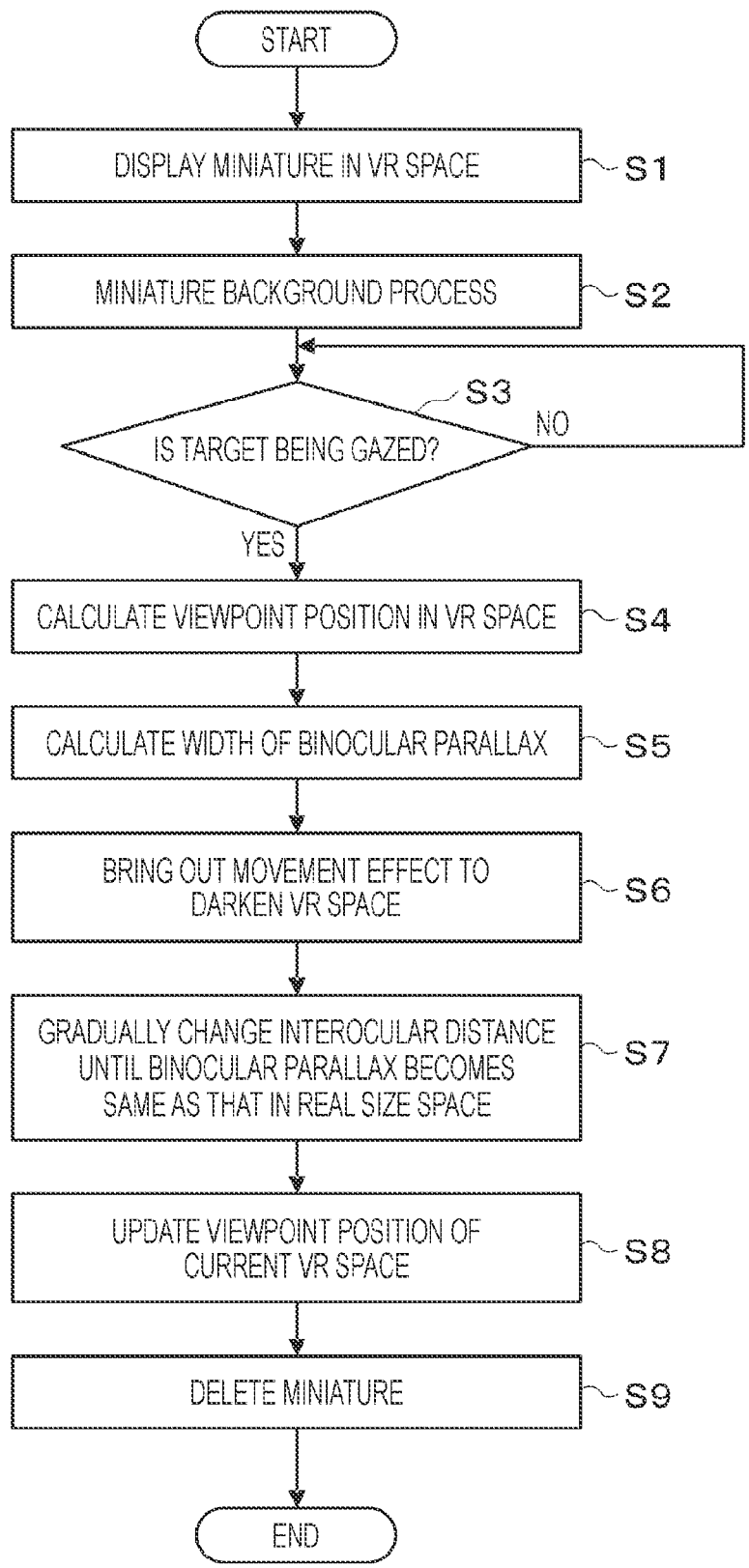
FIG. 21 is a flowchart illustrating an example of a flow of display control processing by a control unit.

Next, display control processing by the control device 10 that performs the control of the display image will be described in detail. FIG. 21 is a flowchart illustrating an example of a flow of the display control processing by the control unit 13 of the control device 10. Note that the following processing can be performed in a changed order as long as there is no problem in each process.

In this display control processing, first, control is performed to display the miniature model M in response to an instruction for miniature display (step S1). For example, the instruction for the miniature display is instructed by the user U using the operation device 30.

Next, it is determined whether or not the user U is viewing the miniature model M on the basis of attitude detection information or the like given from the display device 20, and a background process of blurring the background of the miniature model M so as not to be conspicuous is performed in a case where it is determined that the user is viewing (step S2). When the background is blurred, the miniature model M can be focused on by the user U. Note that this background process is not limited to the blurring, and may be performed by display with white fill or the like, and may be appropriately performed as necessary.

Next, it is determined whether or not the user is gazing at a target to be a reference for the viewpoint change, that is, the miniature model M (step S3). In a case where it is determined in step S3 that the target is not being gazed (NO), the process in step S3 is repeated until it is determined that the target is being gazed. For example, in a case where it is determined that the target is not being gazed even after a lapse of a predetermined period of time, the miniature model M may be deleted to end the processing.

In a case where it is determined in step S3 that the target is being gazed (YES), a position of the user viewpoint in a world coordinate system (VR space coordinate system viewpoint position) is calculated on the basis of a position of the user viewpoint in a local coordinate system (miniature coordinate system viewpoint position) determined as described above (step S4). Specifically, the position of the user viewpoint in the world coordinate system (VR space coordinate system viewpoint position) is calculated on the basis of a position vector of the user viewpoint in the local coordinate system. This VR space coordinate system viewpoint position can be obtained by a known calculation method.

Figure 22A:
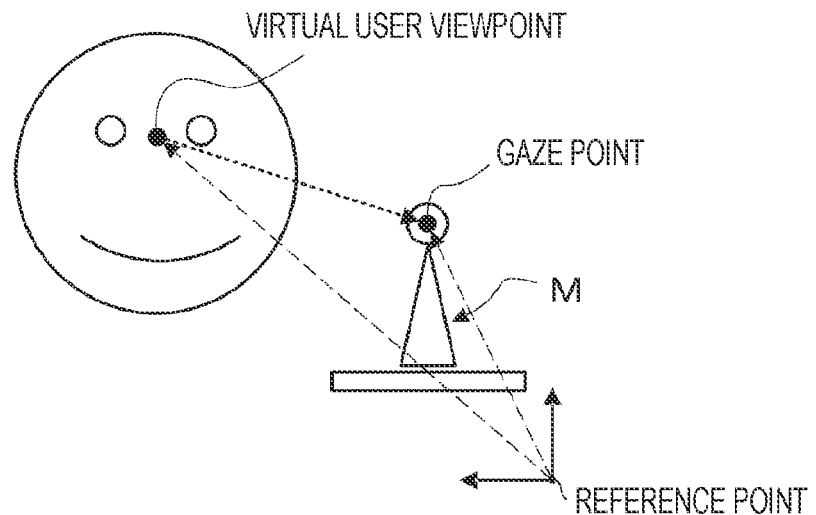
FIG. 22A is a view illustrating an example of a position of a virtual user viewpoint in a local coordinate system. FIG.
Figure 22B:
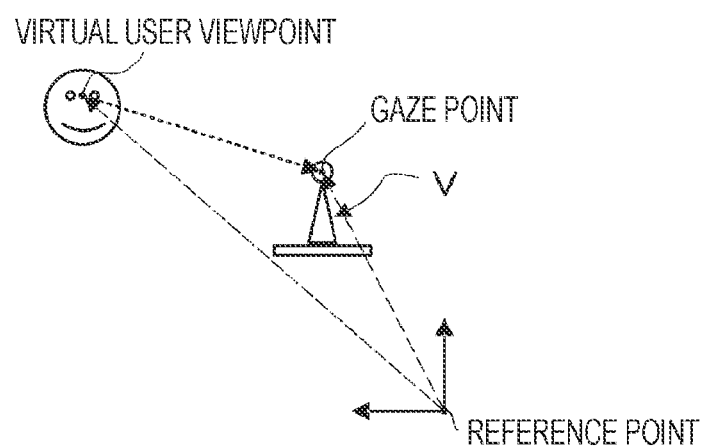

FIGS. 22A and 22B are views illustrating an example of a relationship between the local coordinate system and the world coordinate system. FIG. 22A illustrates an example of the position of the virtual user viewpoint in the local coordinate system, and FIG. 22B illustrates an example of the position of the virtual user viewpoint in the world coordinate system. The control unit 13 obtains a position (coordinate) of the virtual user viewpoint in the world coordinate system having the same appearance as an appearance when the user U is gazing at a gaze point (a head of the miniature model M) from the virtual user viewpoint in the local coordinate system. Note that a line-of-sight orientation is the same as that in the local coordinate system, and can be specified by, for example, the attitude detection information given from the display device 20. For example, the position of the virtual user viewpoint in the world coordinate system is obtained by coordinate conversion of the position of the user viewpoint in the local coordinate system into the position of the user viewpoint in the world coordinate system. At this time, scale conversion is performed such that the miniature model M and a target V in the VR space S have the same appearance from the user U. Since the position of the virtual user viewpoint and the line-of-sight orientation in the VR space S are specified in this manner, it is possible to obtain the same appearance as the appearance of the miniature model M in the VR space S.

As illustrated in FIG. 21, after the calculation of the VR space coordinate system viewpoint position, the width of binocular parallax is calculated using, for example, the distance between the virtual user viewpoint and the gaze point in a real size space (VR space) (step S5). Note that the width of binocular parallax can be calculated by a known calculation method. Here, the display device 20 according to the present embodiment performs three-dimensional (3D) display (display of a stereoscopic view image) using the binocular parallax. Specifically, the above-described display unit 23 independently gives images of different viewpoints to the left eye and the right eye of the user U to display a stereoscopic image behind the display device 20. That is, the control device 10 generates stereoscopic view images (left-eye image and right-eye image) as display images, and controls display such that the generated left-eye image and right-eye image are respectively displayed on the left eye and the right eye of the user U. The left-eye image and the right-eye image are generated so as to have the binocular parallax (distance between corresponding points of the right-eye image and the left-eye image on a panel surface) on a display panel according to interocular distance (interpupillary distance: IPD) of the user U. The method of the 3D display is not limited to the above-described method, and may be, for example, a method of projecting a stereoscopic image between the display panel and the user U or the like. Note that a specific use of the width of the binocular parallax obtained by the above-described calculation will be described later.

Next, the VR space S is deleted (specifically, darkened) by bringing out a movement effect in the periphery of the field of view with the gaze point as the center (step S6). That is, the VR space S around the miniature model M gazed by the user U is deleted.

In a case where the 3D display is performed as described above, a stereoscopic effect is strongly felt when the distance to a display object is short, but the stereoscopic effect is weakened when the distance to the display object is long. That is, a far display object appears to be more planar than a near display object. Therefore, when the miniature model M is to be deleted as described above, the uncomfortable feeling is generated due to a sudden change in the stereoscopic effect if the deletion is suddenly performed to switch to the real size of the VR space S. Therefore, in the present embodiment, the stereoscopic effect of the miniature model M is gradually made to be the same as the stereoscopic effect of the VR space S (target V) after deletion of the miniature model M before the miniature model M is deleted to display the VR space from which the miniature model M is deleted instead of suddenly performing the deletion to switch the display at the time of deleting the miniature model M to display the VR space from which the miniature model M is deleted. Specifically, the stereoscopic effect is adjusted by gradually changing the binocular parallax of the display image described above. That is, the binocular parallax on the display panel is gradually changed to gradually make the stereoscopic effect be the same as the stereoscopic effect at the time of viewing the VR space S. Specifically, the binocular parallax on the display panel can be changed by changing the interocular distance. For example, the interocular distance can be controlled by adjusting the distance between the virtual cameras when the display image is generated. That is, the interocular distance can be changed by adjusting the distance between a left-eye virtual camera and a right-eye virtual camera by software.

Therefore, as illustrated in FIG. 21, after the VR space S is deleted in step S6, the interocular distance is gradually changed until the binocular parallax becomes the same as that in the real size space (VR space) (step S7). That is, the width of the binocular parallax is gradually changed to be the same as the width of the binocular parallax obtained by the above-described calculation. Then, a current viewpoint position of the current VR space S is updated (the VR space after the virtual user viewpoint is moved is displayed) (step S8), and the miniature model M is finally deleted (step S9) to end the processing.

FIG. 23 is a view for describing an example of interocular distance control at the time of deleting the miniature model M. The left side (upstream side) of FIG. 23 illustrates a state where the user U is viewing the miniature model M, and the right side (downstream side) of FIG. 23 illustrates a state where the user U is viewing the target V in the VR space after deletion of the miniature model M. An interocular distance IPD in a normal state is set in advance in accordance with positions of both the eyes of the user U. Then, in a case where the user is viewing the miniature model M, the target V in the virtual space, and the like, a left-eye image and a right-eye image are generated as display images on the basis of this setting. Specifically, the left-eye image and the right-eye image are generated by two virtual cameras (left-eye virtual camera and right-eye virtual camera) corresponding to eye positions L and R of the user U, respectively. Then, the generated left-eye image is displayed on a left-eye display panel, and the right-eye image is displayed on a right-eye display panel. Therefore, the user can perceive a stereoscopic image.

As described above, the uncomfortable feeling is generated if the sudden switching from the state on the left side to the state on the right side in FIG. 23 is performed when the miniature model M is deleted to display the VR space from which the miniature model M is deleted. Therefore, before the deletion of the miniature model M, the interocular distance IPD is adjusted (gradually narrowed) to obtain the same stereoscopic effect as the stereoscopic effect in the case of viewing the target V in the VR space as illustrated in the central portion (midstream portion) of FIG. 23. FIG. 24 is a view for describing binocular parallax controlled by changing the interocular distance IPD. Note that a left-eye image and a right-eye image are displayed in an overlapping manner in FIG. 24. For example, it is assumed that binocular parallax when viewing the miniature model M is P1 as illustrated in the upper part, and binocular parallax when viewing the target V in the VR space is P2 as illustrated in the lower part. Binocular parallax P1 is the distance between the miniature model M (left eye) of the left-eye image and the miniature model M (right eye) of the right-eye image, and binocular parallax P2 is the distance between the target V (left eye) of the left-eye image and the target V (right eye) of the right-eye image.

In this case, the interocular distance IPD is changed until the binocular parallax P1 is gradually changed to P2 before the miniature model M is deleted. For example, in the case of the illustrated example, the stereoscopic effect is gradually weakened. At this time, it is preferable to set a mode and time of a change (for example, at a degree that the user U does not notice) that do not cause the uncomfortable feeling. Therefore, it is possible to reduce the uncomfortable feeling caused by a sudden change in the sense of distance to the target V in the VR space S when the miniature model M has been deleted. Therefore, the fact that the stereoscopic effect gradually changes (is weakened in the illustrated example) is the only difference in appearance (change in image) so that natural viewpoint change becomes possible according to the present embodiment.

As described above, under the control of the control unit 13, the user U moves seamlessly (while viewing the miniature model M) to a place at which the same appearance as that of the viewpoint seen from the miniature model M is obtained. Since the viewpoint is seamlessly changed by confirming the appearance with the miniature model M, the viewpoint is changed while grasping a self-position in the VR space (without requiring continuous movement). Therefore, discomfort such as motion sickness of the user can be dramatically mitigated. That is, when the miniature model M is deleted, what is the same as the miniature model M that has been viewed is displayed as being viewed, and thus, VR motion sickness is not caused and confusion is not caused.

2. Summary

As described above, during control of the display of the VR space S accompanied by the viewpoint change, the control unit 13 performs control to display the miniature model M of the VR space S in a manner changeable to any appearance desired by the user U and to display the VR space S by moving the virtual user viewpoint to a position on the VR space S at which the same appearance as an appearance of the miniature model M is obtained.

Therefore, the user U can view the miniature model M from any position and freely select the position of the virtual user viewpoint. Since the appearance is the same as the appearance of the miniature model M, it is possible to continuously confirm the appearance even if the position of the virtual user viewpoint is discontinuous (the viewpoint is discretely changed). Furthermore, it is possible to move to a desired viewpoint position without being accompanied by continuous movement and without recognizing discontinuity. That is, it is possible to move the viewpoint without being accompanied by continuous movement while grasping a self-position in the real size space.

Although the embodiment of the present technology has been specifically described above, the present technology is not limited to the above-described embodiment, and various modifications based on the technical idea of the present technology are possible. For example, various modifications as described below are possible. Furthermore, one or a plurality of arbitrarily selected modes of the modifications to be described below can be also appropriately combined. Furthermore, the configurations, methods, steps, shapes, materials, numerical values, and the like of the above-described embodiment can be combined with each other without departing from the gist of the present technology.

The display image has been described as the stereoscopic view image (3D image) in the above-described embodiment, but can be a 2D image.

Although the miniature model obtained by reducing the target V has been exemplified as the model of the VR space in the above-described embodiment, the model can be obtained by equal magnification or enlargement of the target V.

Although the copy of the target V has been exemplified as the model of the VR space in the above-described embodiment, the model of the VR space may be one that is clearer than the target V, may be one that is obtained by simplifying or deforming the target V, or the like.

Note that the present technology can also have the following configurations.

(1)

An information processing device including
a control unit that performs control, during control of display of a virtual space accompanied by viewpoint change, to display a model of the virtual space in a manner changeable to any appearance desired by a user, and to display the virtual space by moving a virtual user viewpoint to a position on the virtual space at which the same appearance as an appearance of the model is obtained.

(2)

The information processing device according to (1), in which
the control unit displays the virtual space from the moved virtual user viewpoint, and then, deletes the model to display the virtual space from which the model is deleted.

(3)

The information processing device according to (2), in which
before deleting the model to display the virtual space from which the model is deleted, the control unit gradually sets a stereoscopic effect of the model to be identical to a stereoscopic effect of the virtual space after the deletion of the model.

(4)

The information processing device according to (3), in which
the control unit adjusts the stereoscopic effect by gradually changing binocular parallax of a display image.

(5)

The information processing device according to (4), in which
the binocular parallax is changed by changing an interocular distance between virtual cameras when the display image is generated.

(6)

The information processing device according to any one of (1) to (5), in which
the control unit displays the model to appear at a position closer to the user than the virtual space.

(7)

The information processing device according to any one of (1) to (6), in which
the model is enlarged or reduced with respect to a display size of the virtual space.

(8)

The information processing device according to any one of (1) to (7), in which
the model is a copy of the virtual space.

(9)

The information processing device according to any one of (1) to (8), in which the model includes a whole of the virtual space displayed by a display image.

(10)

The information processing device according to any one of (1) to (9), in which the model is selected by the user from the virtual space displayed by a display image.

(11)

The information processing device according to any one of (1) to (10), in which the control unit causes the model to be displayed to move to a position with any appearance.

(12)

The information processing device according to (11), in which the model moves in conjunction with movement of an operation device operated by the user.

(13)

The information processing device according to any one of (1) to (12), in which the control unit virtually displays an operation device to be operated by the user and displays the model at a position on the virtually displayed operation device.

(14)

The information processing device according to any one of (1) to (13), in which the control unit displays a background of the model not to be conspicuous when the user views the model.

(15)

The information processing device according to any one of (1) to (14), in which the control unit displays the virtual space from the moved virtual user viewpoint after displaying a portion other than the model in dark.

(16)

An information processing method including causing a processor to perform control, during control of display of a virtual space accompanied by viewpoint change, to display a model of the virtual space in a manner changeable to any appearance desired by a user, and to display the virtual space by moving a virtual user viewpoint to a position on the virtual space at which a same appearance as the appearance of the model is obtained.

(17)

A program causing a computer to implement a control function during control of display of a virtual space accompanied by viewpoint change, the control function being configured to display a model of the virtual space in a manner changeable to any appearance desired by a user, and to display the virtual space by moving a virtual user viewpoint to a position on the virtual space at which a same appearance as the appearance of the model is obtained.

REFERENCE SIGNS LIST

1 Information processing system
10 Control device
20 Display device
30 Operation device
13 Control unit
C Controller
M Miniature model
S VR space
P1, P2 Binocular parallax
IPD Interocular distance

The invention claimed is:

1. An information processing device, comprising
a control unit configured to perform control, when display of a virtual space is accompanied by a viewpoint change, a display device
to display a model of the virtual space in a manner changeable to an appearance desired by a user, and
to display the virtual space by movement of a virtual user viewpoint to a position on the virtual space at which a same appearance as an appearance of the model is obtained.

2. The information processing device according to claim 1, wherein the control unit is further configured to:
control the display device to display the virtual space from the moved virtual user viewpoint; and
delete the model, to display the virtual space from which the model is deleted.

3. The information processing device according to claim 2, wherein
prior to deletion of the model to display the virtual space from which the model is deleted, the control unit is further configured to gradually set a stereoscopic effect of the model identical to a stereoscopic effect of the virtual space subsequent to the deletion of the model.

4. The information processing device according to claim 3, wherein
the control unit is further configured to adjust the stereoscopic effect of the model by gradual change of binocular parallax of a display image.

5. The information processing device according to claim 4, wherein
the binocular parallax is changed by change of an interocular distance between virtual cameras when the display image is generated.

6. The information processing device according to claim 1, wherein
the control unit is further configured to control the display device to display the model at a position closer to the user than the virtual space.

7. The information processing device according to claim 1, wherein
the model is one of enlarged or reduced with respect to a display size of the virtual space.

8. The information processing device according to claim 1, wherein
the model is a copy of the virtual space.

9. The information processing device according to claim 1, wherein
the model includes the virtual space displayed by a display image.

10. The information processing device according to claim 1, wherein
the model is selected by the user from the virtual space displayed by a display image.

11. The information processing device according to claim 1, wherein
the control unit is further configured to control the display device to display the model to move to a position with the appearance desired by the user.

12. The information processing device according to claim 11, wherein
the model moves in conjunction with movement of an operation device operated by the user.

13. The information processing device according to claim 1, wherein
the control unit is further configured to control the display device to:

virtually display an operation device operated by the user, and display the model at a position on the virtually displayed operation device.

14. The information processing device according to claim 1, wherein the control unit is further configured to control the display device to display a background of the model not to be conspicuous when the user views the model.

15. The information processing device according to claim 1, wherein the control unit is further configured to control the display device to display the virtual space from the moved virtual user viewpoint subsequent to display of a portion other than the model in dark.

16. An information processing method, comprising performing control, during control of display of a virtual space accompanied by a viewpoint change, a display device to display a model of the virtual space in a manner changeable to an appearance desired by a user, and to display the virtual space by moving a virtual user viewpoint to a position on the virtual space at which a same appearance as an appearance of the model is obtained.

17. A non-transitory computer-readable medium having stored thereon, computer-executable instructions which, when executed by a processor of a computer, cause the computer to execute operations, the operations:

performing control, during control of display of a virtual space accompanied by a viewpoint change, a display device to display a model of the virtual space in a manner changeable to an appearance desired by a user, and to display the virtual space by moving a virtual user viewpoint to a position on the virtual space at which a same appearance as an appearance of the model is obtained.

* * * * *